United States Patent
Kim et al.

(10) Patent No.: US 8,583,187 B2
(45) Date of Patent: Nov. 12, 2013

(54) SHIELDING STRUCTURES FOR WIRELESS ELECTRONIC DEVICES WITH DISPLAYS

(75) Inventors: Moon Kim, Palo Alto, CA (US); Abbas Jamshidi Roudbari, Sunnyvale, CA (US); Qishan Yu, San Diego, CA (US); Wei Yao, Palo Alto, CA (US); Scott Mullins, San Jose, CA (US)

(73) Assignee: Apple Inc., Cupertino, CA (US)

( * ) Notice: Subject to any disclaimer, the term of this patent is extended or adjusted under 35 U.S.C. 154(b) by 457 days.

(21) Appl. No.: 12/899,509

(22) Filed: Oct. 6, 2010

(65) Prior Publication Data
US 2012/0087065 A1    Apr. 12, 2012

(51) Int. Cl.
*H04M 1/00*    (2006.01)

(52) U.S. Cl.
USPC ............... 455/566; 455/575.1; 361/679.01

(58) Field of Classification Search
USPC ........ 455/575.5, 575.7, 575.8, 566, 575.1, 455/403, 550.1, 68.1, 556.2, 425, 88, 90.3, 455/66.1; 333/181–186, 24 R, 12; 361/679.01, 818; 600/410, 411, 420, 600/432, 431; 604/131, 151, 155, 890.1; 174/350, 260, 388
See application file for complete search history.

(56) References Cited

U.S. PATENT DOCUMENTS

| | | | | |
|---|---|---|---|---|
| 4,187,481 | A * | 2/1980 | Boutros | 333/182 |
| 5,359,206 | A * | 10/1994 | Yamamoto et al. | 257/59 |
| 5,596,628 | A * | 1/1997 | Klein | 379/93.11 |
| 5,621,363 | A * | 4/1997 | Ogden et al. | 333/12 |
| 5,656,872 | A * | 8/1997 | Lee | 307/91 |
| 5,764,693 | A * | 6/1998 | Taylor et al. | 375/222 |
| 5,940,153 | A * | 8/1999 | Castaneda et al. | 349/58 |
| 5,965,916 | A * | 10/1999 | Chen | 257/347 |
| 6,104,461 | A * | 8/2000 | Zhang et al. | 349/122 |
| 6,940,564 | B2 * | 9/2005 | Murden et al. | 349/1 |
| 7,217,588 | B2 * | 5/2007 | Hartzell et al. | 438/51 |
| 7,328,047 | B2 * | 2/2008 | Zhu et al. | 455/566 |
| 7,425,749 | B2 * | 9/2008 | Hartzell et al. | 257/414 |
| 7,569,410 | B2 * | 8/2009 | Hartzell et al. | 438/51 |
| 7,753,882 | B2 * | 7/2010 | Susi | 604/131 |
| 2001/0026252 | A1 | 10/2001 | Shibata et al. | |
| 2002/0051112 | A1 * | 5/2002 | Katsura | 349/153 |
| 2002/0140669 | A1 | 10/2002 | Hsu | |
| 2005/0018121 | A1 * | 1/2005 | Jen et al. | 349/151 |

(Continued)

FOREIGN PATENT DOCUMENTS

| WO | 2009/085660 | 7/2009 |
|---|---|---|
| WO | 2009/085777 | 7/2009 |

*Primary Examiner* — Melody Mehrpour
(74) *Attorney, Agent, or Firm* — Treyz Law Group; G. Victor Treyz; David C. Kellogg

(57) ABSTRACT

Electronic devices such as computers and handheld devices are provided. The electronic devices may have electrical components such as displays that are driven by driver circuitry. During operation, the driver circuitry may generate radio-frequency noise. Communications circuitry in the electronic devices may be shielded from the radio-frequency noise by radio-frequency shielding structures. The shielding structures may be mounted on portions of the display module, on a cover glass layer, or on other structures such as housing structures. The radio-frequency shielding structures may be formed from one or more metal segments. The metal segments may run along edges of the display. A device housing may have a ground formed from a conductive peripheral member that runs around peripheral edges of the housing and a conductive plate that is connected to the conductive peripheral member. The radio-frequency shielding structure may be connected to the ground using conductive structures.

28 Claims, 23 Drawing Sheets

(56) References Cited

U.S. PATENT DOCUMENTS

| | | |
|---|---|---|
| 2005/0041166 A1* | 2/2005 | Yamazaki et al. ............ 349/42 |
| 2005/0214984 A1* | 9/2005 | Maruyama et al. ........... 438/149 |
| 2006/0012969 A1* | 1/2006 | Bachman ...................... 361/816 |
| 2006/0046787 A1 | 3/2006 | Zhu et al. |
| 2007/0085753 A1 | 4/2007 | Wu et al. |
| 2007/0291172 A1* | 12/2007 | Kouzimoto et al. .......... 348/488 |
| 2008/0079860 A1* | 4/2008 | Kunimori et al. ............... 349/43 |
| 2009/0122021 A1 | 5/2009 | Liu et al. |
| 2009/0280757 A1 | 11/2009 | Zhu et al. |
| 2010/0105452 A1 | 4/2010 | Shin et al. |

* cited by examiner

SHIELDING STRUCTURES FOR WIRELESS ELECTRONIC DEVICES WITH DISPLAYS

BACKGROUND

This relates generally to wireless electronic devices and, more particularly, to reducing signal interference in wireless electronic devices with displays.

Electronic devices such as cellular telephones and other devices often contain wireless communications circuitry. The wireless communications circuitry may include, for example, cellular telephone transceiver circuits for communicating with cellular telephone networks. Wireless communications circuitry in an electronic device may also include wireless local area network circuits and other wireless circuits. Antenna structures are used in transmitting and receiving wireless signals.

Electronic devices also often contain displays. For example, liquid crystal displays are often provided in cellular telephones. Displays contain arrays of image pixels. For example, liquid crystal displays contain arrays of image pixels based on liquid crystal material. Electrodes in the arrays are used to apply controlled electric fields to the liquid crystal material to change its optical properties and thereby create an image on the display. Display driver circuits are used to generate drive signals for the electrodes in the array.

Challenges arise when mounting displays and wireless circuitry within electronic devices. In many devices, for example, space is at a premium, so there is a desire to locate antennas and displays in close proximity to each other. At the same time, the display driver circuits that are used in driving signals into a display can produce signals that can interfere with the operation of wireless circuits. This potential for signal interference tends to be exacerbated when display structures are located in the vicinity of antennas and other wireless circuitry.

It would therefore be desirable to provide improved ways in which to incorporate displays and wireless circuits in wireless electronic devices.

SUMMARY

An electronic device such as a portable device may have an electrical component such as a display. The display may be implemented using a rectangular display module that is located on a front surface of an electronic device. A cover layer such as a layer of cover glass may be used to cover the display module. The display module may be based on a liquid crystal display configuration having a layer of liquid crystal material interposed between opposing color filter and thin-film-transistor layers. The color filter layer and thin-film-transistor layer may have substrates formed from materials such as glass.

Display driver circuitry may be used to drive signals into the display. The display driver circuitry may include a driver integrated circuit that is mounted to one end of the thin-film-transistor layer. Control lines such as gate lines may be used to distribute signals to the display from the display driver circuitry.

During operation of the display module, the display module may generate radio-frequency noise signals. The noise signals may serve as a source of potential interference for other circuitry in the device such as wireless circuitry. Wireless circuitry may include antenna structures such as cellular telephone antenna structures and wireless local area network antenna structures.

Radio-frequency shielding structures may provide electromagnetic shielding that helps prevent radio-frequency noise signals from the display module from interfering with the operation of wireless circuitry. Radio-frequency shielding structures may be formed from conductive segments of material such as metal lines. The conductive segments may run along one or more of the edges of the display module. For example, three conductive segments may be configured to form a U-shaped shielding structure. A single conductive strip may be located along the end of the display module opposite to the end that contains the display driver integrated circuit (as an example). In locations such as these, the shielding structure may help to block radio-frequency noise from the display.

Shielding structures may be formed from patterned conductive material that is located on part of a display module such as on a thin-film-transistor layer substrate, may be formed on a cover glass layer, or may be formed on other structures such as a protruding portion of a housing plate or other housing structure. Conductive structures such as conductive adhesive, conductive lines, conductive foam, conductive springs, and conductive traces on flex circuit substrates and other substrates may be used in electrically connecting radio-frequency shielding structures to a ground element in an electrical device. The ground element may be formed by conductive housing structures such as a conductive peripheral housing structure that runs around the edges of the device and a conductive plate structure that spans the width of the device and that is connected on its left and right edges to the conductive peripheral housing structure.

The display driver circuitry may issue control pulses for image pixels in the display. The display driver circuitry may, for example, issue gate control pulses on gate lines. The shape of the control pulses that are issued may be smoothed internally by the display driver circuitry or externally using discrete or distributed loading circuitry on the signal lines. Smoothing the control pulses so that their edges have reduced abruptness may help reduce frequency harmonics in the radio-frequency noise produced by the display module and may therefore reduce interference with the wireless circuitry.

Further features of the invention, its nature and various advantages will be more apparent from the accompanying drawings and the following detailed description.

DETAILED DESCRIPTION

Electronic devices may be provided with wireless communications circuitry. The wireless communications circuitry may be used to support wireless communications in one or more wireless communications bands. Antenna structures in an electronic device may be used in transmitting and receiving radio-frequency signals. The electronic device may have a display. Shielding structures may be provided along one or more edges of the display to minimize signal interference between the display and the wireless communications circuitry.

Figure 1:
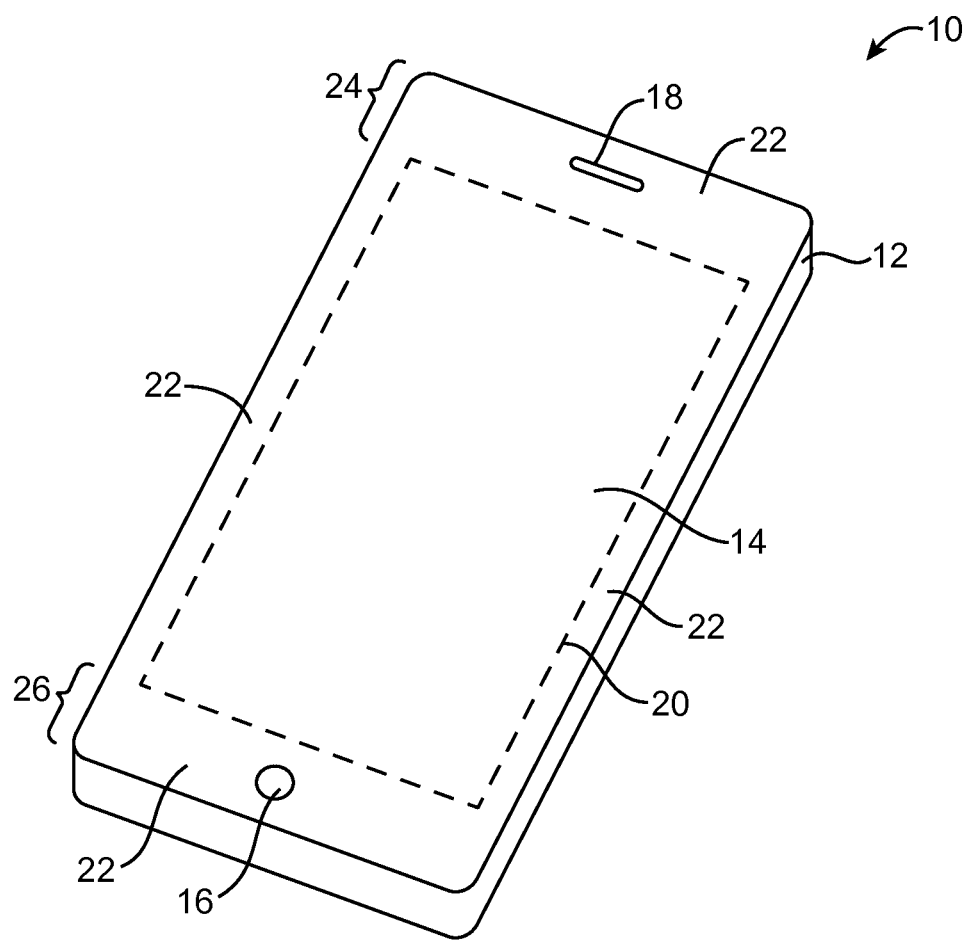
FIG. 1 is a perspective view of an illustrative electronic device with a display and wireless circuitry in accordance with an embodiment of the present invention.

An illustrative electronic device that contains wireless communications circuitry, a display, and shielding structures that minimize interference between the display and wireless communications circuitry is shown in FIG. 1. Device 10 of FIG. 1 may be a notebook computer, a tablet computer, a computer monitor with an integrated computer, a desktop computer, or other electronic equipment. If desired, electronic device 10 may be a portable device such as a cellular telephone, a media player, a wrist-watch device, a pendant device, an earpiece device, or other compact portable device.

As shown in FIG. 1, device 10 may have a housing such as housing 12. Housing 12 may be formed from materials such as plastic, metal, carbon fiber and other fiber composites, ceramic, glass, wood, other materials, or combinations of these materials. Device 10 may be formed using a unibody construction in which some or all of housing 12 is formed from a single piece of material (e.g., a single cast or machined piece of metal, a single piece of molded plastic, etc.) or may be formed from frame structures, housing sidewall structures, and other structures that are assembled together using fasteners, adhesive, and other attachment mechanisms.

Device 10 may include components such as buttons, input-output port connectors, ports for removable media, sensors, microphones, speakers, status indicators, and other device components. As shown in FIG. 1, for example, device 10 may include buttons such as menu button 16. Device 10 may also include a speaker port such as speaker port 18 (e.g., to serve as an ear speaker for device 10).

One or more antennas may be formed in device 10. The antennas may, for example, be formed in locations such as locations 24 and 26 to provide separation from the conductive elements of display 14. Antennas may be formed using single band and multiband antenna structures. Examples of communications bands that may be covered by the antennas include cellular telephone bands (e.g., the bands at 850 MHz, 900 MHz, 1800 MHz, 1900 MHz, and 2100 MHz), satellite navigation bands (e.g., the Global Positioning System band at 1575 MHz), wireless local area network bands such as the IEEE 802.11 (WiFi®) bands at 2.4 GHz and 5 GHz, the Bluetooth band at 2.4 GHz, etc. Examples of antenna configurations that may be used for the antennas in device 10 include monopole antennas, dipole antennas, strip antennas, patch antennas, inverted-F antennas, coil antennas, planar inverted-F antennas, open slot antennas, closed slot antennas, loop antennas, hybrid antennas that include antenna structures of multiple types, or other suitable antenna structures.

Device 10 may include one or more displays such as display 14. Display 14 may be a liquid crystal display (LCD), an organic light-emitting diode (OLED) display, a plasma display, an electronic ink display, etc. A touch sensor may be incorporated into display 14 (i.e., display 14 may be a touch screen). The touch sensor may be an acoustic touch sensor, a resistive touch sensor, a piezoelectric touch sensor, a capacitive touch sensor (e.g., a touch sensor based on an array of indium tin oxide capacitor electrodes), or a touch sensor based on other touch technologies.

Display 14 may be covered by a transparent planar conductive member such as a layer of glass or plastic. The cover layer for display 14, which is sometimes referred to as a cover glass layer or cover glass and which is shown as layer 37 in FIG. 2, may extend over substantially all of the front face of device 10, as shown in FIG. 1. The rectangular center portion of the cover glass (surrounded by dashed line 20 in FIG. 1) contains an array of image pixels and is sometimes referred to as the active portion of display 20. The peripheral outer portion of the cover glass (i.e., rectangular peripheral ring 22 of FIG. 1) does not contain any active image pixels and is sometimes referred to as the inactive portion of display 14. A patterned opaque masking layer such as a peripheral ring of black ink may be formed under inactive portion 22 to hide interior device components from view by a user.

Figure 2:
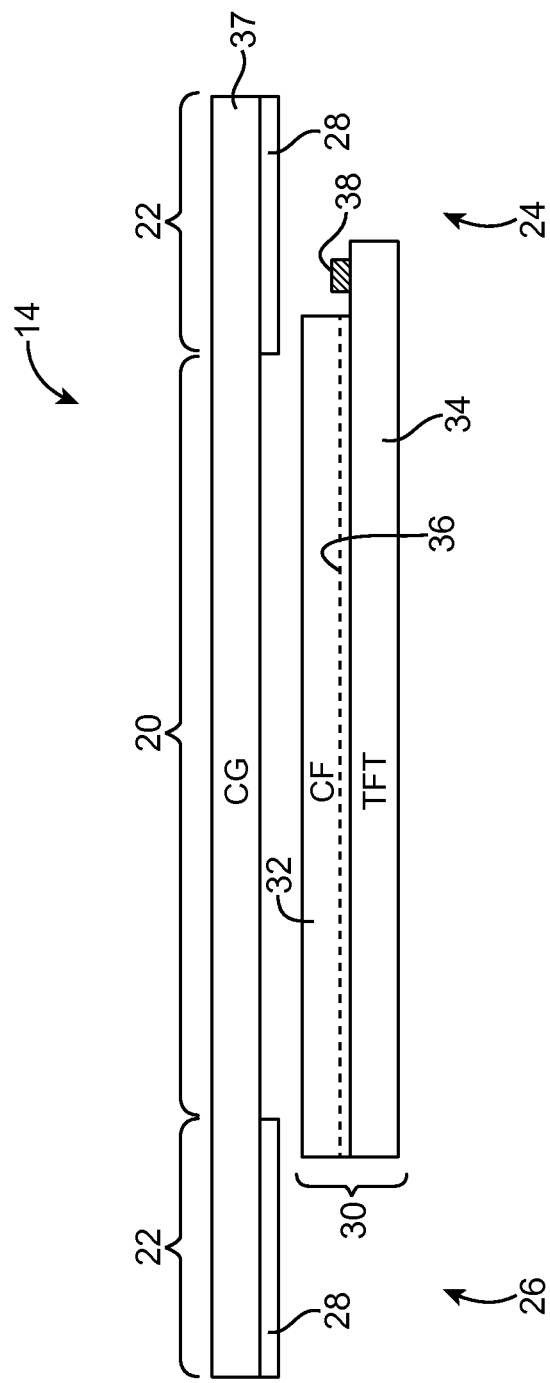
FIG. 2 is a cross-sectional view of a display module and display cover layer in accordance with an embodiment of the present invention.

A cross-sectional side view of display 14 taken along the longitudinal axis of device 10 of FIG. 1 is shown in FIG. 2. As shown in FIG. 2, black ink 28 may be formed on the interior surface of cover glass 37 under inactive portion 22 of display 14. In the example of FIG. 2, display 14 is a liquid crystal display (LCD) and has a display module (display module 30) that is formed from color filter layer 32 and thin-film-transistor (TFT) layer 34. A layer of liquid crystal material (layer 36) may be interposed between thin-film-transistor layer 34 and color filter layer 32.

Driver circuitry 38 (e.g., a driver integrated circuit) may receive image data from processing circuitry in device 10 and may produce corresponding control signals for display module 30. Display module 30 may contain image pixels that contain electrodes. The electrodes may be used to impose an electric field on an associated portion of the liquid crystal material, thereby altering its optical properties and modulating the amount of light that is transmitted through that image pixel. Color filter layer 32 may contain an array of colored filter elements such as red, green, and blue color filter elements to provide display module 30 with the ability to display color images. Thin-film-transistor layer 34 may contain an array of transistors for controlling the application of the electric field to the electrodes. The transistors of the array may be controlled by the control signals from driver circuitry 38.

Substrate materials that may be used for thin-film-transistor layer 34 and color filter layer 32 include glass, ceramic, plastic, etc. If desired, a touch sensor may be incorporated into module 30 to provide display 14 with touch sensitivity. The touch sensor may be formed from an array of transparent indium tin oxide capacitor electrodes in a capacitive touch sensor configuration or may be formed using other touch technologies. Capacitive touch sensor electrodes may be provided on a substrate layer in module 30, on the underside of cover layer 37, or on other suitable substrate layers (e.g., a substrate layer formed from glass, ceramic, plastic, etc.).

The signals that driver circuit 38 uses to control the image pixels in display module 30 have the potential to lead to undesirable radio-frequency interference. Typical signal frequencies associated with the signals produced by circuit 38 are in the 1-100 kHz range (e.g., 30 kHz). The signals that are output by circuit 38 and associated harmonics can interfere with radio-frequency signals being handled by wireless communications circuitry in device 10. For example, cellular telephone communications can be disrupted. The potential for undesirable interference can be particularly acute when antennas are mounted within housing 12 in close proximity to display module 30 (e.g., in locations such as locations 24 and 26 of FIG. 1).

Figure 3:
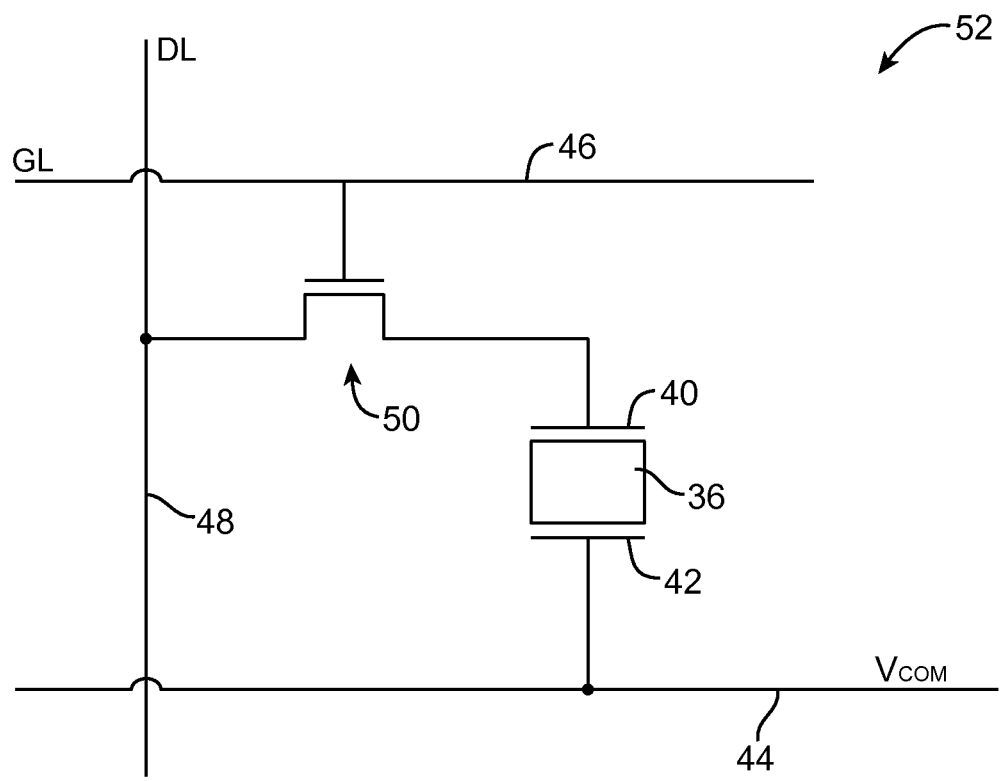
FIG. 3 is a circuit diagram of a liquid crystal display image pixel circuit in accordance with an embodiment of the present invention.

Drive (control) signals from driver circuitry 38 may include, for example, analog data line signals DL, gate line signals GL, and common voltage signals Vcom. An illustrative image pixel circuit for an LCD pixel in display module 30 is shown in FIG. 3. Image pixel circuit 52 of FIG. 3 may be used to control the state of a single pixel of display module 30. In a typical display, display module 30 will contain thousands or millions of pixels.

As shown in FIG. 3, liquid crystal material 36 may be located between respective electrodes 40 and 42. Electrodes 40 and 42 impose an electric field on liquid crystal material 36, which controls the polarization properties of material 36 and, in conduction with polarizer layers and other optical films in display module 30, controls the amount of transmitted light associated with the image pixel. Data line voltage DL on data line 48 may be an analog voltage (e.g., a 0-5V voltage that has one of 256 possible voltage values in an 8-bit system). The magnitude of signal DL may be used to establish a desired grayscale level for the light transmission through liquid crystal pixel 36. Gate line voltage GL on gate line 46 may be a digital control pulse of about 16 microseconds in width that is used to activate image pixel 52. Pulses GL may be spaced about 16 ms from each other (i.e., signal GL may contain a train of 16 microsecond pulses each spaced 16 ms from each other). Other pulse widths and pulse spacings may be used if desired. These numerical values are provided as an example.

When gate line signal GL in a given pixel goes high, the thin-film transistor in that pixel (i.e., transistor 50) is turned on and the signal DL on data line 48 is conveyed to electrode 40. Electrode 42 is electrically connected to common voltage line (Vcom line) 44. Lines such as line 44 may be controlled individually or in groups (e.g., one or more Vcom lines in the image array may be shorted together). The voltage signal Vcom on line 44 is generally equal in magnitude and opposite in sign to that of data line signal DL to effectively double the electric field between electrodes 40 and 42.

Figure 4:
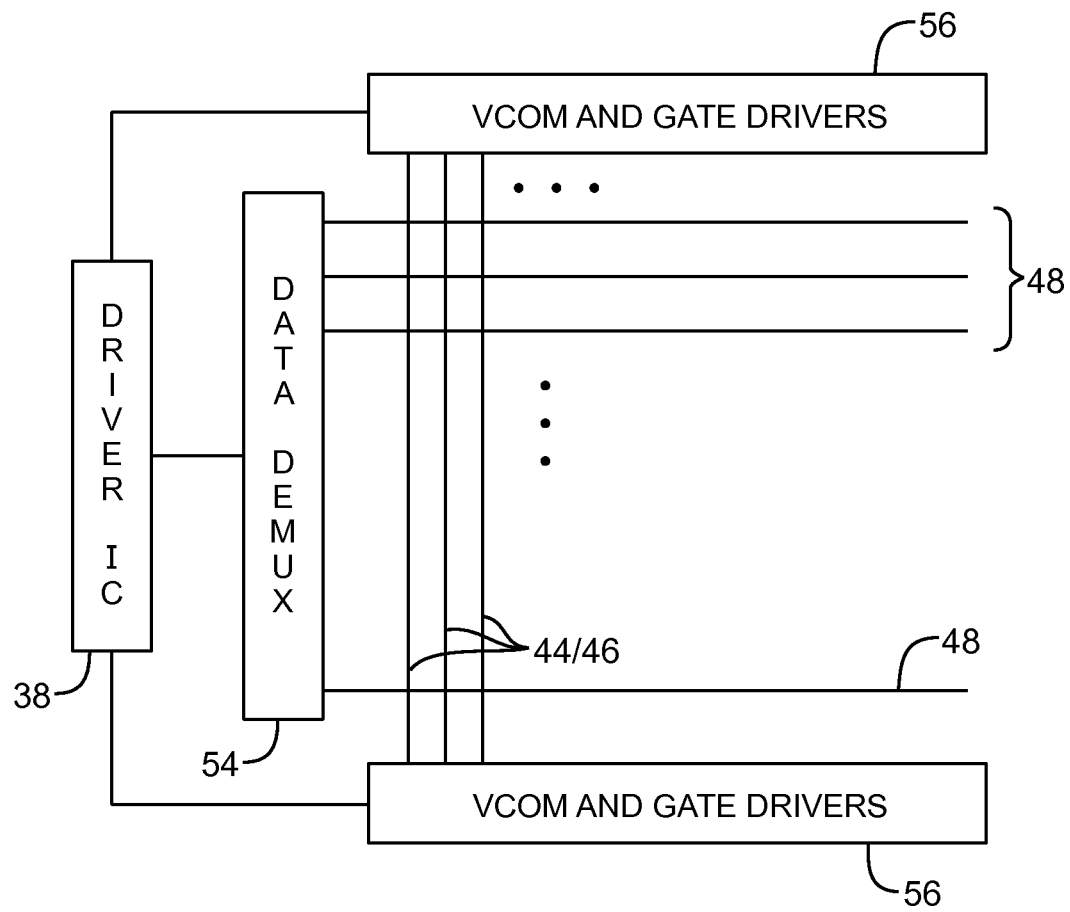
FIG. 4 is a schematic diagram of an illustrative image pixel array and associated driver circuitry in which gate drivers have been implemented using circuitry adjacent to the image pixel cells in accordance with an embodiment of the present invention.

FIG. 4 is a top view of an illustrative layout that may be used for the signal lines in display module 30. As shown in FIG. 4, the driver circuitry of driver integrated circuit 38 may be coupled to driver circuitry 54 and 56. The output of driver integrated circuit 38 may include data line signals that contain grayscale information for multiple color channels, such as red, green, and blue channels. Demultiplexing circuitry 54 may demultiplex this data line signal into respective R, G, and B data line signals on respective data lines 48. Driver circuitry 56 may be used to drive voltage signal Vcom and gate signals GL onto lines 44 and 46.

Driver integrated circuit 38 may be mounted on thin-film-transistor layer 34, as shown in FIG. 34. Some or all of data demultiplexing circuitry 54 and/or driver circuitry 56 may be implemented as part of driver integrated circuit 38 or may be implemented using circuit components fabricated on the thin-film-transistor substrate layer 34. For example, in configurations in which transistors on thin-film-transistor layer 34 are fabricated using low temperature polysilicon (LIPS) fabrication techniques, the performance of the transistors may be satisfactory for forming both demultiplexing circuitry 54 and Vcom and gate driver circuitry 56 from transistor structures on substrate 34. In configurations in which amorphous silicon transistor technology is used to form transistors on substrate 34, it may be desirable to incorporate the circuitry of Vcom and gate drivers 56 into driver integrated circuit 38, while implementing the circuitry of data line demultiplexer circuitry 54 using amorphous silicon transistors on substrate 34. An illustrative circuit layout that may be associated with this type of arrangement is shown in FIG. 5.

Figure 5:
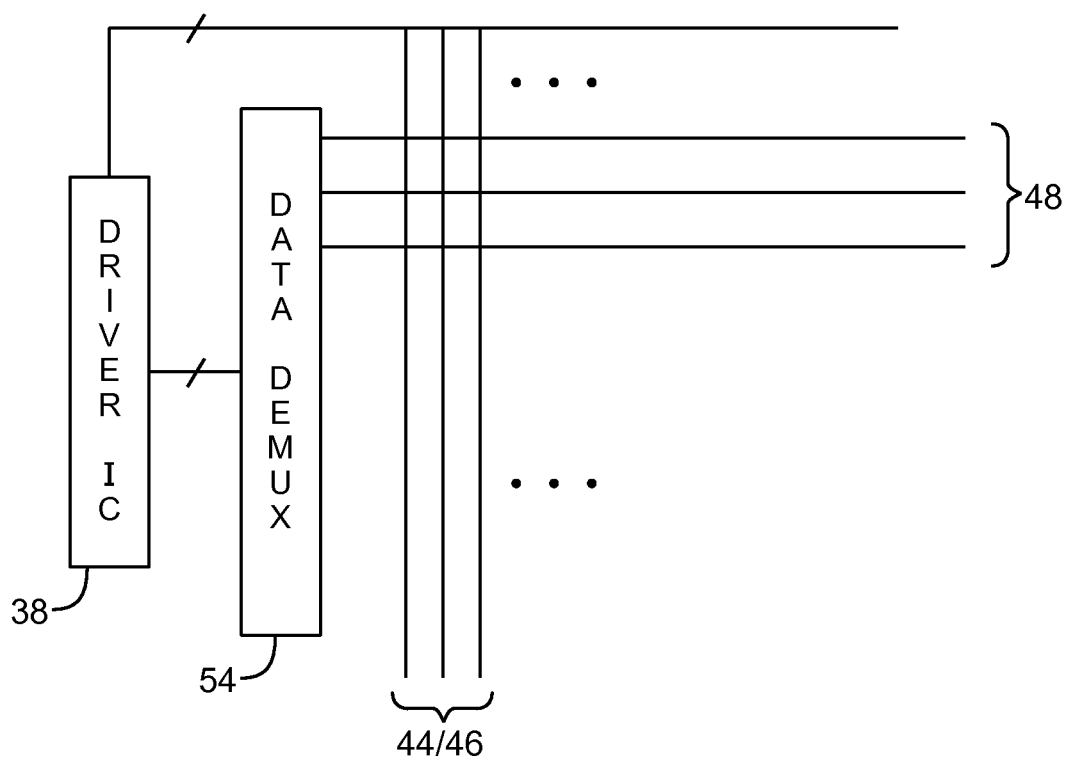
FIG. 5 is a schematic diagram of an illustrative image pixel array and associated driver circuitry in which gate drivers have been implemented using circuitry within a driver integrated circuit in accordance with an embodiment of the present invention.
Figure 6:
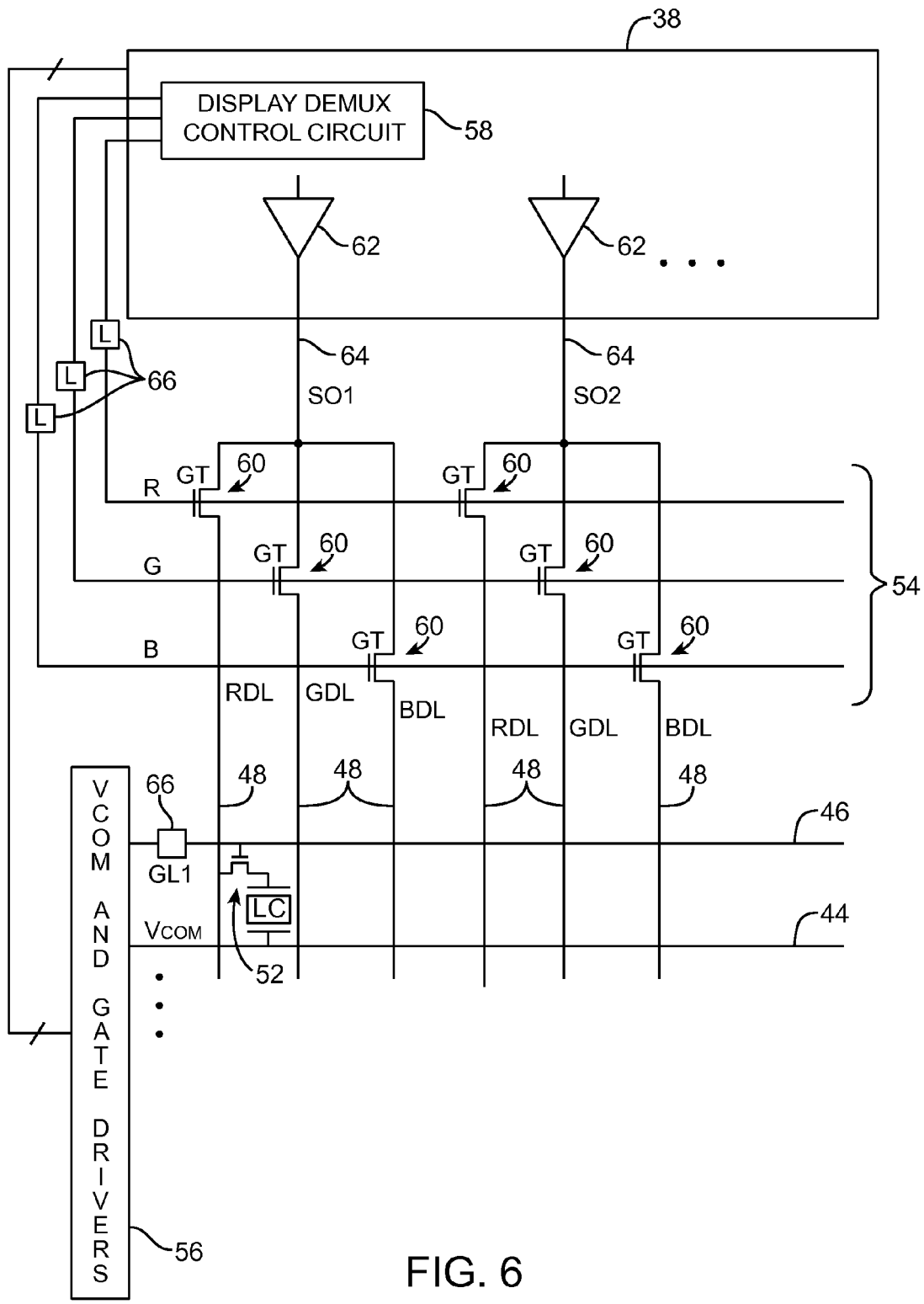
FIG. 6 is a circuit diagram of an image pixel array and associated driver circuitry in accordance with an embodiment of the present invention.

FIG. 6 is a circuit diagram showing circuitry that may be used to implement circuits of the type shown in FIGS. 4 and 5. In the FIG. 6 example, Vcom and gate line driver circuitry 56 has been implemented using transistors that are separate from driver integrated circuit 38. This is merely illustrative. If desired, circuitry 56 may be implemented within driver integrated circuit 38.

As shown in the example of FIG. 6, display demultiplexer control circuitry 58 in driver integrated circuit 38 may be used to supply data line demultiplexer control signals R, G, and B (corresponding to red, green, and blue channels in this example) to the gates GT of demultiplexer transistors 60. Drivers 62 may produce data line output signals SO1, SO2, . . . (sometimes referred to as source output signals) on data line paths 64. The source output signals contain analog pixel data for image pixels of all three colors (i.e., red, blue, and green). The control signals that are applied to the gates of demultiplexing transistors 60 turn transistors 60 on and off in a pattern that routes red channel information from the source output signals to red data lines RGL, that routes green channel information from the source output signals to green data lines GDL, and that routes blue channel information from the source output signals to blue data lines BDL.

Optional loading circuits 66 may be implemented using one or more discrete components (e.g., capacitors, inductors, and resistors) that are interposed within lines 54 or may be implemented in a distributed fashion using some or all of the structures that form lines 54. Optional loading circuits 66 and/or circuitry in integrated circuit (e.g., circuit 58) and/or circuit 56 may be used to control the shape of the gate signals GL and demultiplexing control signals R, G, and S. Signal shaping techniques such as these may be used to smooth display control signal pulses such as the gate line and demultiplexer control signal pulses and thereby reduce harmonic signal production and radio-frequency interference.

Figure 7:
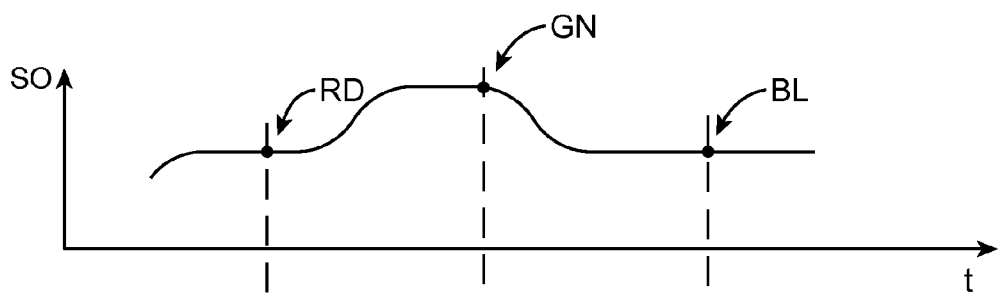
FIG. 7 is a graph of an illustrative data line signal of the type that may be used in the circuitry of FIG. 6 in accordance with an embodiment of the present invention.
Figure 8:
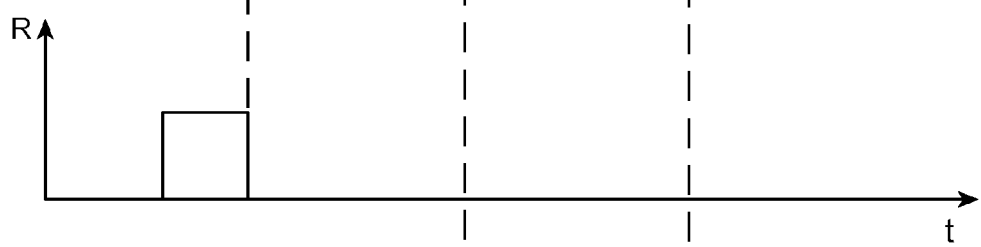
FIG. 8 is a graph of an illustrative red channel demultiplexing control signal of the type that may be used in the circuitry of FIG. 6 in accordance with an embodiment of the present invention.
Figure 9:
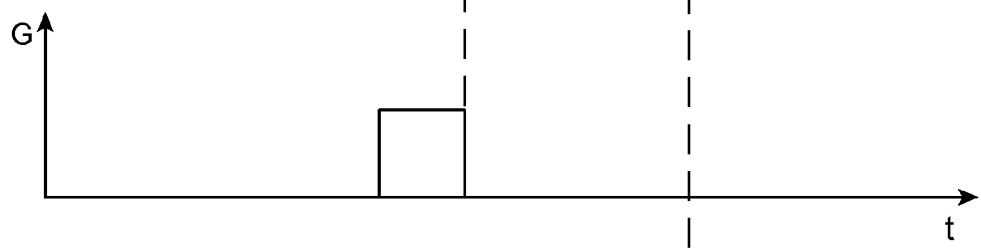
FIG. 9 is a graph of an illustrative blue channel demultiplexing control signal of the type that may be used in the circuitry of FIG. 6 in accordance with an embodiment of the present invention.
Figure 10:
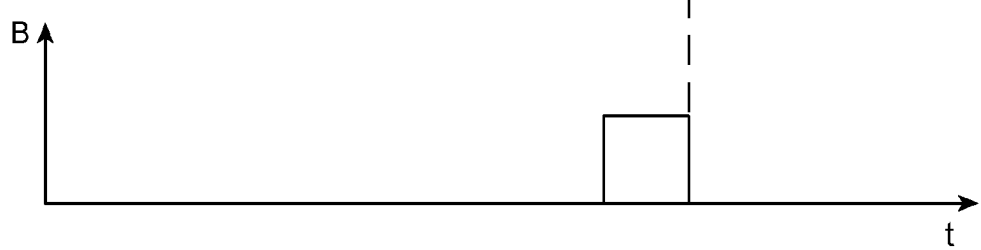
FIG. 10 is a graph of an illustrative green channel demultiplexing control signal of the type that may be used in the circuitry of FIG. 6 in accordance with an embodiment of the present invention.
Figure 11:
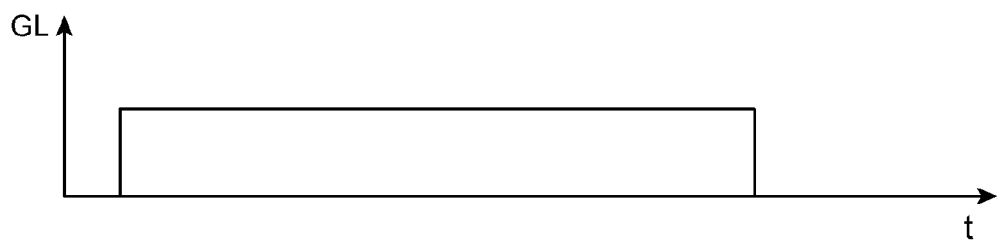
FIG. 11 is a graph of an illustrative gate line signal that may be used in the circuitry of FIG. 6 in accordance with an embodiment of the present invention.

FIG. 7 is a graph of a typical source output signal SO. As shown in FIG. 7, signal SO contains red channel information (the magnitude of signal SO at point RD), green channel information (the magnitude of signal SO at point GN), and blue channel information (the magnitude of signal SO at point BL). Demultiplexer control signals R (FIG. 8), G (FIG. 9), and B (FIG. 10) may be formed from pulses that lie within the pulse window formed by gate line signal GL (FIG. 11). When both the demultiplexing control signal and the gate line signal are being asserted, the relevant portion of the source output signal SO is routed to electrode 40 (FIG. 3). For example, when signal R (FIG. 8) and gate line signal GL (FIG. 11) are both high, the demultiplexing transistor that is controlled by signal R is turned on and transistor 50 in the image pixel cell is turned on, so that signal RD is applied to electrode 40. This electrode is associated with a red color filter in a red pixel. Similarly, the G demultiplexing control signal works with gate line signal GL to apply signal GN to the electrode in a green pixel and the B demultiplexing control signal works with the gate line signal GL to apply signal BL to the electrode in a blue pixel.

Conventionally, signals R, G, B, and GL have shapes that are substantially rectangular. However, the sharp transitions at the rising and falling edges of this type of display control signal can lead to undesirable frequency harmonics and may create unsatisfactory radio-frequency signal interference with wireless circuitry.

Signal harmonics and interference may, if desired, be reduced by shaping the R, G, B, and GL pulses. For example, the R, G, B, and GL signals may be smoothed so that they exhibit more gradual rising and falling edges (e.g., as in a sinusoidal signal).

Figure 12:
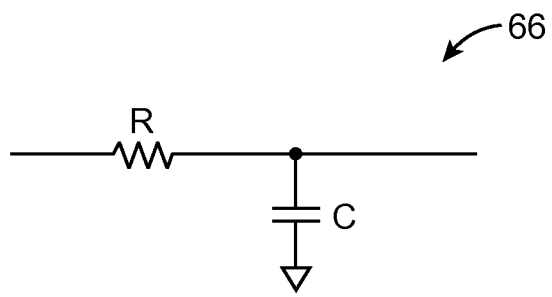
FIG. 12 is a circuit diagram of an illustrative pulse smoothing circuit that may be used in circuitry of the type shown in FIG. 6 in accordance with an embodiment of the present invention.

FIG. 12 shows an illustrative loading circuit that may be used within a demultiplexer control signal path (e.g., one of the paths for the R, G, and B signals in FIG. 16) and/or the gate line driver path (e.g., path 46 of FIG. 6). As shown in FIG. 12, loading circuit 66 may include a resistance (resistor R) and capacitance (capacitor C). If desired, other loading circuit designs may be used (e.g., loading circuits that include inductors, etc.). The arrangement of FIG. 12 is merely illustrative.

Resistor R may be implemented using one or more discrete resistors (as an example). Capacitor C may be implemented using one or more discrete capacitors. If desired, there may be multiple loading circuits (i.e., multiple circuits such as circuit 66 of FIG. 12) interposed within a given control line (i.e., within one of multiplexer control lines 54 of FIG. 6 or within one of gate lines 46 of FIG. 6).

Figure 14:
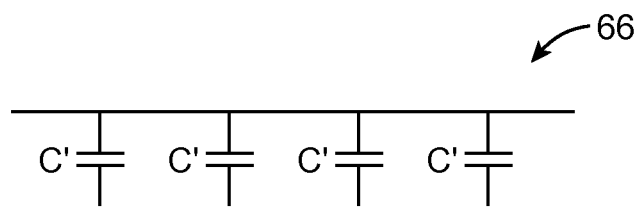
FIG. 14 is a circuit diagram of a signal line of the type shown in FIG. 6 showing how the signal line may exhibit distributed capacitance that may serve as the capacitance of FIG. 12 in accordance with an embodiment of the present invention.

Resistors, capacitors, and inductors for loading circuit 66 may also be implemented using distributed structures. Resistor R may, for example, be implemented by narrowing the width and/or thickness of a control line sufficiently that the resistance of the control line itself forms resistor R. In this type of arrangement, resistor R may be modeled as being formed from numerous series-connected resistors R', as shown in FIG. 14. Similarly, capacitance C of loading circuit 66 may be implemented by placing the conductive trace that forms the control line path adjacent to a ground plane or other structure that allows the line itself to form a distributed capacitor (illustrated as capacitors C' in the example of FIG. 14).

Figure 13:
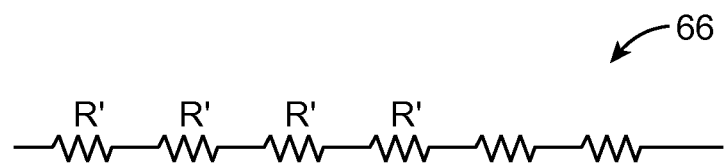
FIG. 13 is a circuit diagram of a signal line of the type shown in FIG. 6 showing how the signal line may exhibit distributed resistance that may serve as the resistance of FIG. 12 in accordance with an embodiment of the present invention.
Figure 15:
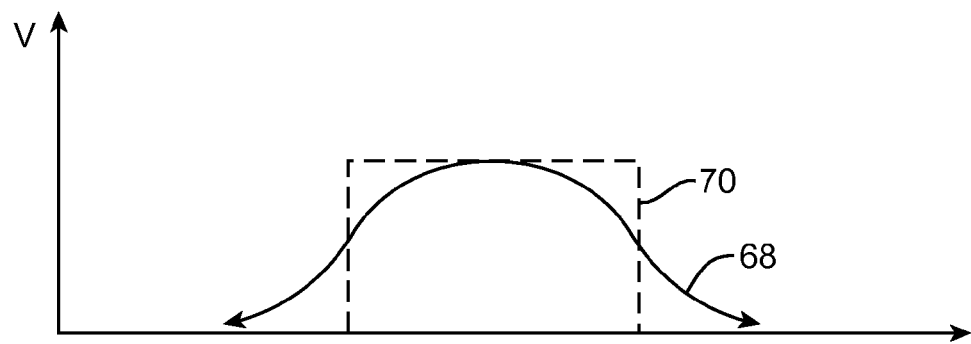
FIG. 15 is a graph showing how gate line and demultiplexing control signals in circuitry of the type shown in FIG. 6 may be smoothed to minimize the generation of signal harmonics with the potential to interfere with wireless circuit operation in accordance with an embodiment of the present invention.

When loading circuitry such as circuitry 66 of FIGS. 12, 13, and 14 is present within the display module control lines, the signals that are carried on the control lines tend to exhibit reduced rise and fall times (i.e., the control pulses tend to be smoothed out due to R-C effects) and therefore exhibit noise with reduced higher-order frequency harmonics. Control pulse smoothing may also be implemented by the display driver circuitry (e.g., circuitry in display demultiplexer control circuitry 58 that generates signals R, G, and B), control circuitry in drivers 56 (e.g., circuitry that generates gate line signals GL), etc. The pulse shaping circuitry may generate smoothed control pulses such as smoothed pulse 68 of FIG. 15. As shown in FIG. 15, pulse 68 may have more gradual rising and falling edges than conventional rectangular control pulse 70. Pulse 68 may have a sinusoidal shape or nearly sinusoidal shape or other pulse shape that is smoothed relative to conventional rectangular pulse 70. Smoothed (gradual rising and falling edge) pulses such as pulse 68 of FIG. 15 may be used for signals R, G, B, and DL in displays having circuitry of the type shown in FIG. 6 (as an example).

Figure 16:
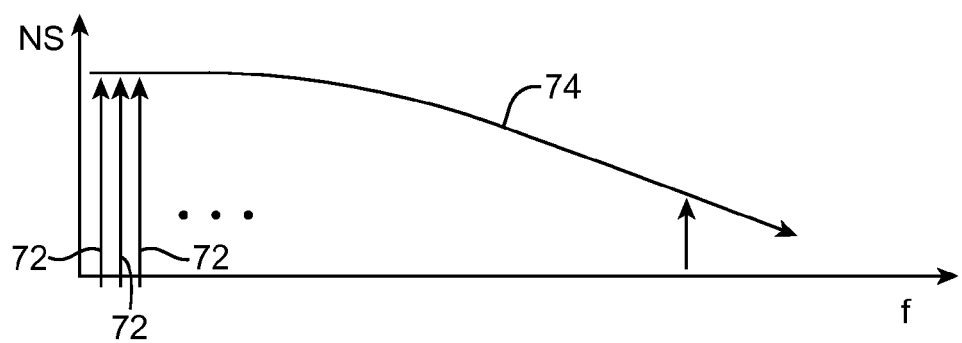
FIG. 16 is a graph of a conventional display driver signal spectrum showing how harmonic signals that may potentially interfere with wireless circuit operation may be generated during device operation.

FIG. 16 shows a typical noise spectrum of the type that is produced when driving conventional (rectangular) pulses into a display module. As shown in FIG. 16, there are noise components 72 associated with the control pulses. Noise components 72 may include a 30 kHz fundamental noise component, a 60 kHz second harmonic noise component, and numerous additional higher-order harmonics. Collectively, noise components 72 lead to a relatively broad spectrum of display-generated noise, as shown by noise spectrum curve 74.

Figure 17:
FIG. 17 is a graph of a display driver signal spectrum of the type that may be produced using smoothed signals of the type shown in FIG. 15 in accordance with an embodiment of the present invention.

When smoothed pulses such as pulses 68 are used in the display control circuitry of FIG. 6, the sharp rising and falling edges of the control pulses are absent. As a result, higher-order frequency harmonics are substantially reduced. This is illustrated by the relatively small number of illustrative noise components 78 and the small size of noise spectrum curve 76 of FIG. 17.

Figure 18:
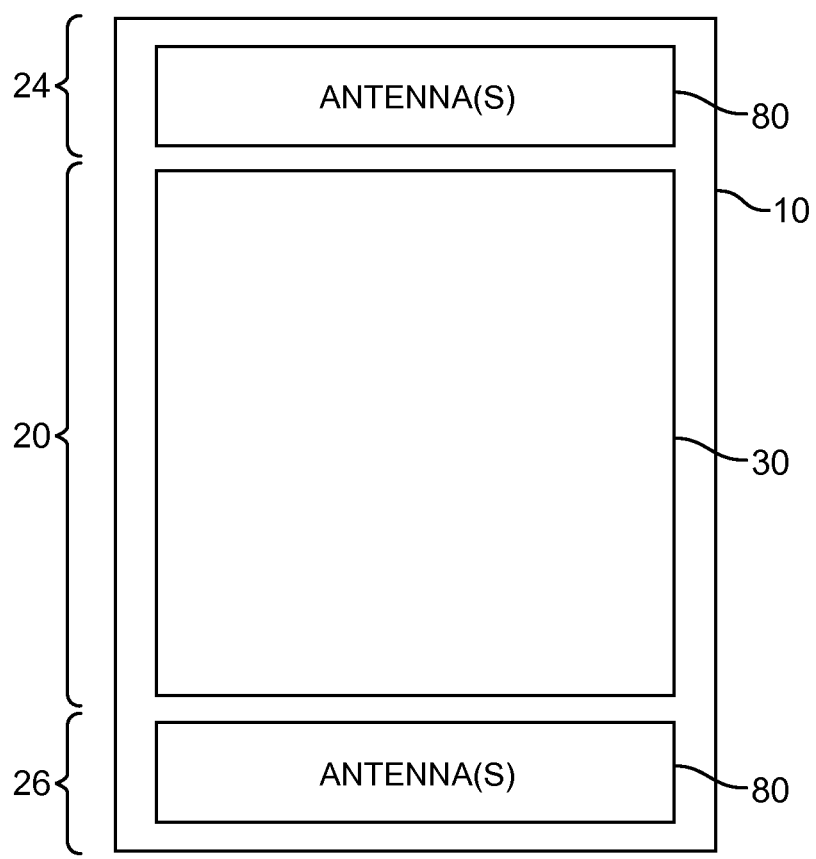
FIG. 18 is a top view of an illustrative electronic device with antenna structures formed at upper and lower ends of the device in accordance with an embodiment of the present invention

The potential for interference between display module 30 and wireless circuitry in device 10 may be exacerbated in configurations where antenna structures in device 10 are located adjacent to display module 30. As shown in FIG. 18, for example, antenna(s) 80 may be located in regions such as end regions 24 and 26 in device 10, adjacent to the ends of display module 30. When control signals are applied to the image pixels in display module 30 by driver integrated circuit 38 and driver circuitry such as demultiplexer 54 and drivers 56, noise signals (e.g., noise signals of the type shown in FIG. 16 or noise signals of the type shown in FIG. 17) may be coupled into antenna(s) 80. If care is not taken, the operation of the wireless circuitry such as cellular telephone circuitry, wireless local area network circuitry, or other wireless communications circuitry with which antenna(s) 80 are used may be adversely affected.

Figure 19:
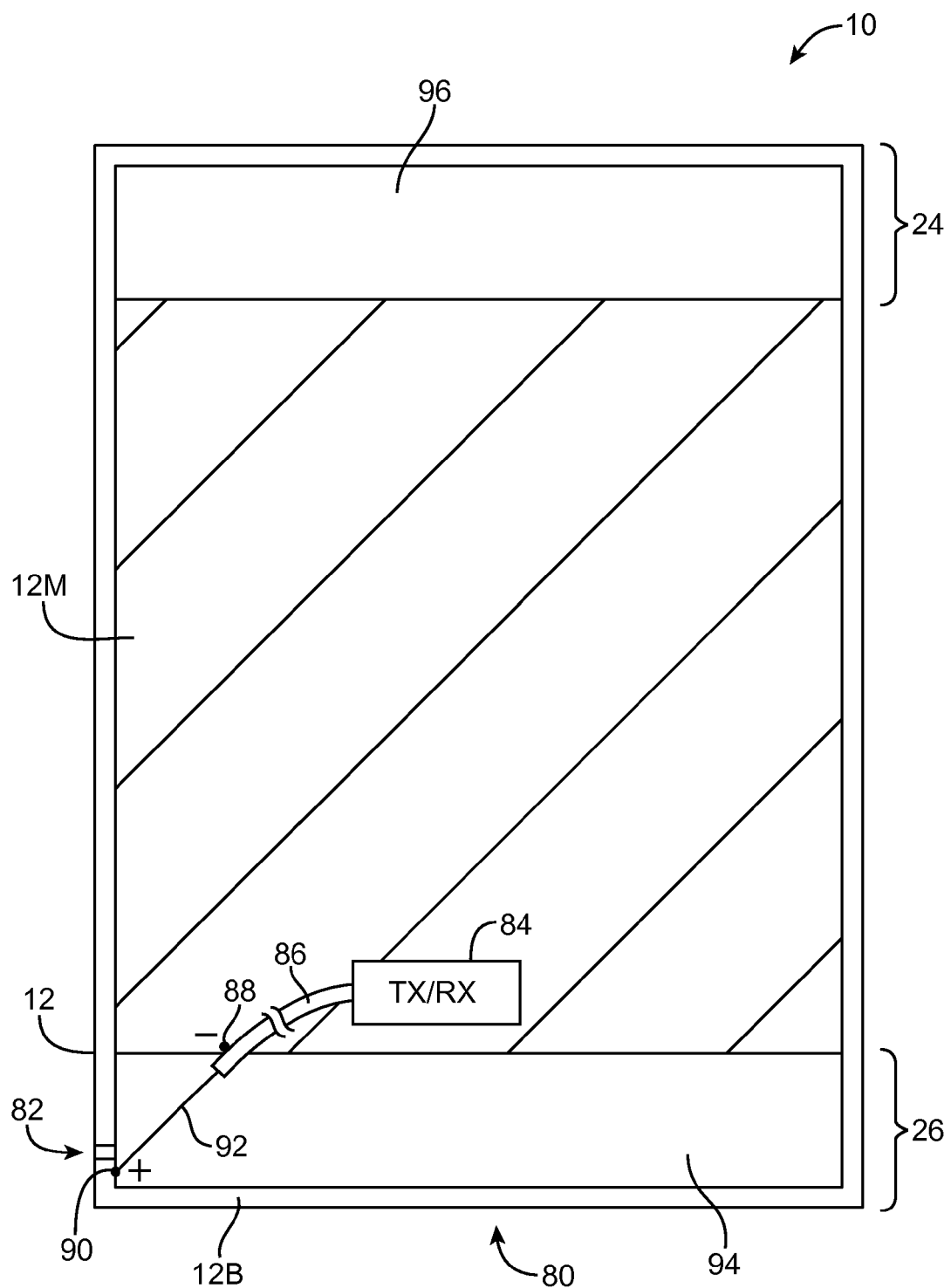
FIG. 19 is a top view of an illustrative electronic device showing how an antenna may be formed at least partly using conductive device housing structures in accordance with an embodiment of the present invention.

If desired, antennas may be formed using parts of housing 12. As shown in FIG. 19, for example, antenna 80 may be formed in lower region 26 of housing 12. Housing 12 may contain a peripheral conductive member such as peripheral band member 12B that runs around the periphery of device 10. Member 12B may, for example, form a bezel for display 14 or may form vertical housing sidewalls for housing 12. Planar member 12M (sometimes referred to as a planar housing member, housing plate, or midplate) may be connected to the sides of housing band 12B (i.e., on the left and right in the orientation of FIG. 19). Gap 94 may be formed between the lower edge of housing plate 12M and peripheral conductive member 12B. Gap 96 may be formed between the upper edge of housing plate 12M and peripheral conductive member 12B. Gaps such as gaps 94 and 96 may be filled with air and other dielectrics and may be used in forming antenna structures 80. For example, gaps 94 and 96 may be used in forming slot antenna structures, hybrid antenna structures that include slot antenna structures, loop antennas, or other antenna structures. Gap 96 may be used in forming an antenna in region 24. Gap 94 may be used in forming an antenna in region 26.

As shown in FIG. 19, antenna 80 in region 26 may include a gap such as gap 82 in peripheral conductive member 12B. Gap 82 may be formed from plastic or other dielectric material. There may be one or more gaps such as gap 82 in the portion of peripheral conductive member 12B that forms each antenna. A radio-frequency transceiver (sometimes referred to as a radio) such as transceiver 84 may be used to feed each antenna. Transceiver 84 may be used to handle any suitable communications bands of interest (e.g., cellular telephone bands, wireless local area network bands, etc.). Device 10 may contain one or more transmission lines. For example, a transmission line such as transmission line 86 may be used to couple transceiver 84 to an antenna feed for antenna 80 of FIG. 19.

In the example of FIG. 19, midplate 12M is formed from a conductive material such as metal and forms a ground element. Antenna 80 has an antenna feed that includes positive antenna feed terminal 90 that is connected to peripheral conductive member 12B and ground antenna feed terminal 88 that is connected to midplate 12M. Midplate 12M and conductive peripheral member 12B may be shorted to each other (e.g., using welds, fasteners, etc.). Transmission line 86 may be a microstrip transmission line, a stripline transmission line, a coaxial cable, etc. Transmission line 86 may have a ground conductor such as an outer braid conductor on a coaxial cable that is connected to ground terminal 88 and may have a positive signal conductor such as a coaxial cable center conductor (conductor 92 of FIG. 19) that is connected to positive antenna feed terminal 90. Matching networks, other types of antenna structures, and other feed arrangements may be used if desired. The illustrative structures for feeding antenna 80 in FIG. 19 are merely illustrative.

When a display module such as display module 30 of FIG. 2 is mounted within device 10 of FIG. 19, display module 30 and active display region 20 may overlap midplate 12M without protruding substantially into gaps 96 and 94 (as an example). In this type of configuration, gaps 94 and 96 may be relatively unaffected by the conductive lines and other conductive structures in display module 30. Nevertheless, due to the close proximity between display module 30 and antennas 80, there is a potential for interference.

To prevent interference from display module 30 from interfering with the operation of antennas 80, one or more strips of conductive shielding material may be provided along one or more of the edges of the display. The shielding structures may be formed from metals or other conductive materials and may be formed on display module structures, cover glass 37, housing structures, or other suitable structures within device 10.

Figure 20:
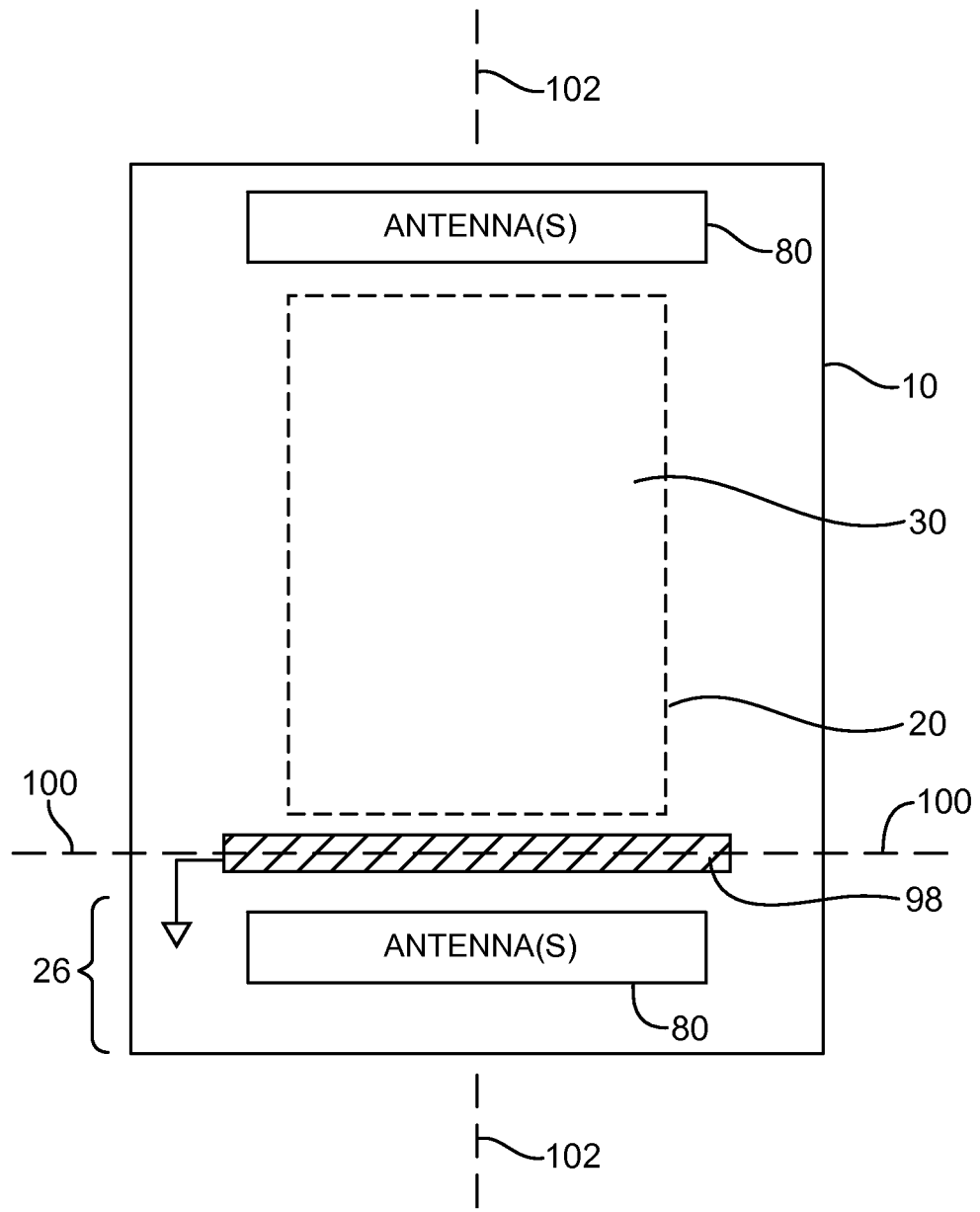
FIG. 20 is a top view of an illustrative electronic device showing how a strip-shaped conductive element may serve as a shielding structure that helps minimize radio-frequency interference between a display and wireless circuitry in the device in accordance with an embodiment of the present invention.

In some configurations of device 10, device 10 may include cellular telephone antenna structures in lower region 26. Region 24 may be used for wireless local area network antenna structures, cellular telephone antennas, and other antenna structures. The cellular telephone antenna structures in region 26 and associated cellular telephone transceiver circuitry may be sensitive to interference. In this type of arrangement, it may be desirable to form a shielding structure from a strip of conductor that is located along the lower edge of display active region 20. As shown in FIG. 20, for example, shielding structure 98 may have an elongated shape with a longitudinal axis (axis 100) that runs perpendicular to longitudinal axis 102 of device 10 (as an example). In the arrangement of FIG. 20, shielding structure 98 is grounded and is interposed between the lower portion of display 20 (display module 30) and antenna(s) 80 in region 26. Shielding structure 98 may serve to block electromagnetic signals from display 20 and may therefore help to block radio-frequency noise signals from the display that might otherwise be received by the antenna in region 26 and associated cellular telephone circuitry. Shielding structure 98 may be grounded by electrically connecting shielding structure 98 to a ground element such as a ground plane formed by midplate 12M (FIG. 19).

Figure 21:
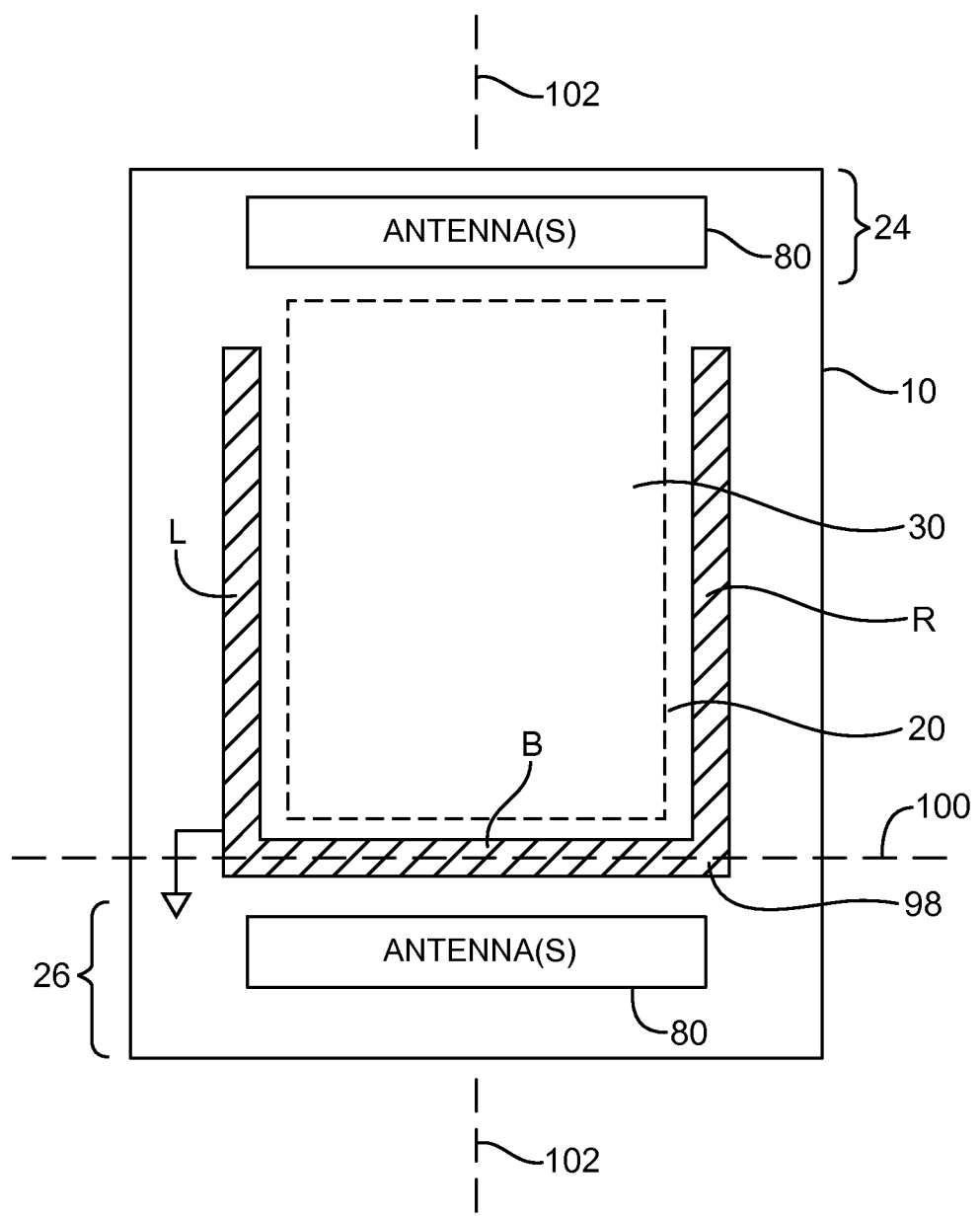
FIG. 21 is a top view of an illustrative electronic device showing how a U-shaped conductive element may serve as a shielding structure that helps minimize radio-frequency interference between a display and wireless circuitry in the device in accordance with an embodiment of the present invention.

Another illustrative shielding arrangement is shown in FIG. 21. In the configuration of FIG. 21, shielding structure 98 has three segments. Left and right shielding segments L and R respectively run parallel to longitudinal axis 102 of device 10 and module 30. Bottom segment B runs parallel to axis 100 and perpendicular to axis 102. Shielding structure 98 may be grounded by connecting shielding structure 98 to a grounded conductive housing structure or other ground plane element using a conductive path. Shielding structure 98 may be configured so as to surround three sides of active region 20 of display module 30.

A U-shaped shielding structure of the type shown in FIG. 21 may be satisfactory for shielding antenna structure 80 in lower housing region 26 of device 10 from interference produced by display module 30. The omission of an upper segment of shielding structure 98 interposed between display module 30 and antenna structures 80 in region 24 may allow some radio-frequency noise from display module 30 to reach these antenna structures, but may help reduce capacitive coupling between display module 30 and antenna structures 80 in lower region 26 and therefore may help improve isolation between display module 30 and antenna structures 80 in lower region 26. The amount of noise that is coupled to antenna structures 80 in region 24 may be acceptable, particularly when antenna structures 80 operate at frequencies that are relatively unaffected by lower frequency noise (e.g., when antenna structures 80 in region 24 are generally operated in wireless local area network bands at 2.4 GHz and 5 GHz, etc.).

Figure 22:
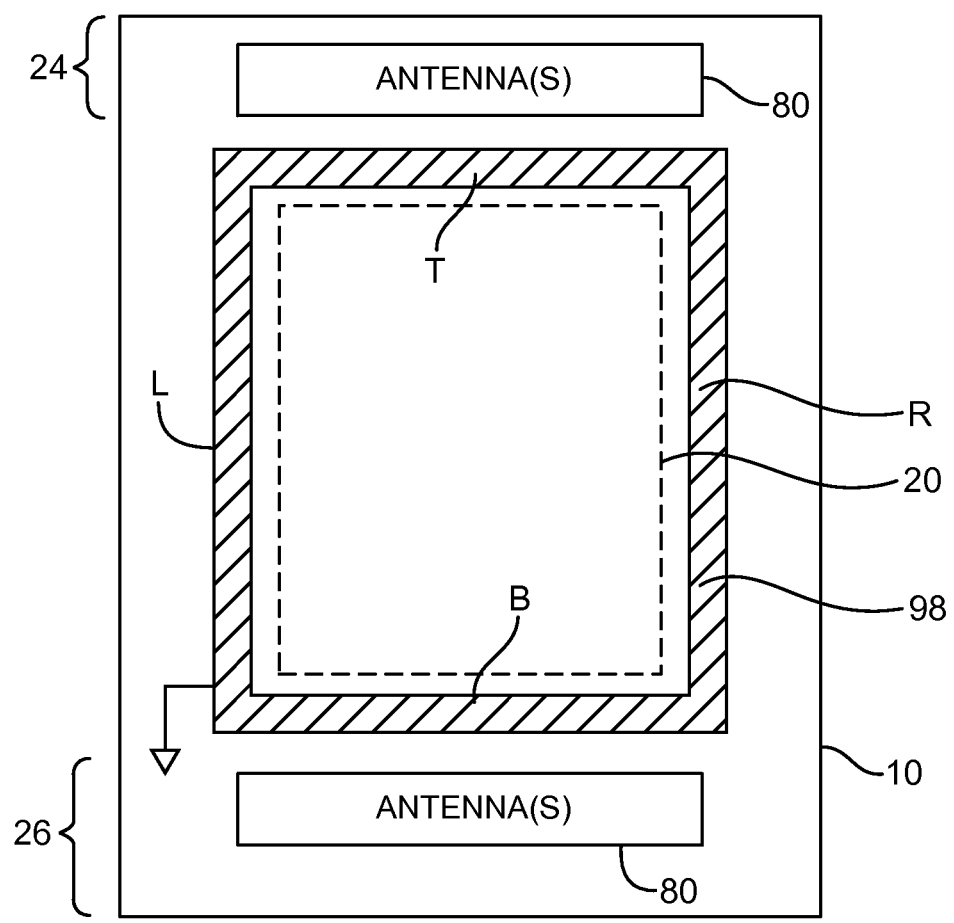
FIG. 22 is a top view of an illustrative electronic device showing how a conductive element having the shape of a rectangular ring that surrounds a display may serve as a shielding structure that helps minimize radio-frequency interference between the display and wireless circuitry in the device in accordance with an embodiment of the present invention.

If desired, shielding structures 98 may be configured to surround all or substantially all four sides of the display in device 10. For example, shielding structure 98 may be formed in the shape of a rectangular ring that surrounds active region 20 of display module 30 as shown in the example of FIG. 22. In this type of configuration, shielding structures 98 may be provided with an upper segment such as conductive segment T that is connected to left segment L and right segment R. Lower segment B may be connected between left and right segments L and R. As shown in FIG. 22, segment T of shielding structure 98 may be interposed between antenna structures 80 in upper region 24 of device 10, which may help reduce interference between display module 30 and antenna structures 80 in upper region 24.

Other configurations may be used for shielding structure 98 if desired. For example, shielding structure 98 may be formed by a rectangular ring of conductor that surrounds active region 20 of module 30, but that has one or more gaps. Conductive structures for forming shielding structure 98 may include elemental metals, metal alloys, and other conductive materials. The width of shielding structure 98 may be, for example, less than 2 mm, less than 1 mm, less than 0.5 mm, in the range of 0.3 to 1.3 mm, in the range of 0.5 to 1 mm, etc. Shielding structures 98 may be formed by screen printing, painting, pad printing, ink jet printing, physical vapor deposition, chemical vapor deposition, photolithography, electroplating, etc.

Figure 23:
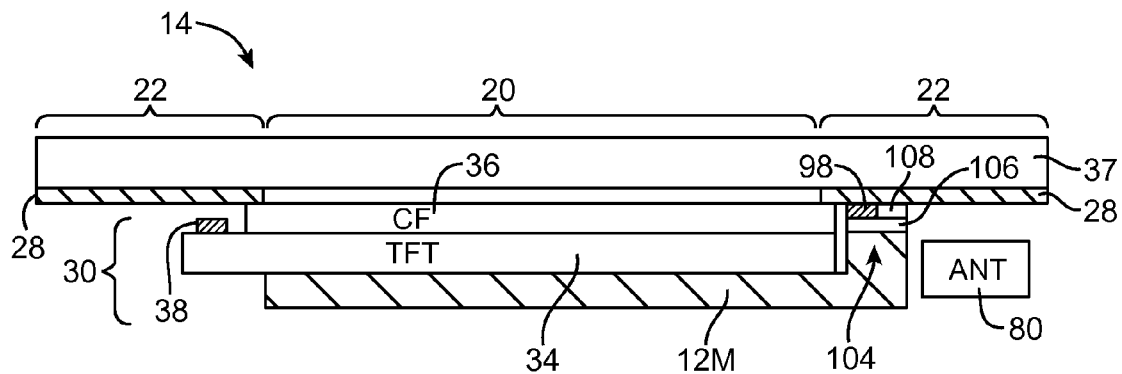
FIG. 23 is a cross-sectional side view of display structures with signal shielding structures formed at the interface with a display cover layer in accordance with an embodiment of the present invention.

Some or all of the material that makes up shielding structure 98 may be formed on or adjacent to cover glass layer 37 or housing structures in housing 12. As shown in FIG. 23, for example, shielding structure 98 may be formed on or adjacent to opaque masking layer 28 (e.g., black ink) on cover glass layer 38. Shielding structure 98 may, for example, be formed from patterned metal traces that are formed on the underside of cover glass 37 (e.g., by depositing and patterning shielding structures 98 on cover glass 37). If desired, shielding structure 98 may be formed on a housing structure such as midplate structure 12M of FIG. 23. Midplate 12M may be formed from metal and may be welded to conductive housing sidewall structures 12B as described in connection with FIG. 19. Midplate 12M may form part of a ground element in device 10. As shown in FIG. 23, shielding structure 98 may be formed on layer 106 on a protrusion such as portion 104 of midplate 12M. Layer 106 may be formed from a material such as plastic or other dielectric material (as an example). Adhesive 108 may be interposed between layer 106 and cover glass 37 to help hold the structures of FIG. 23 together when assembled within device 10. Shielding structure 98 of FIG. 23 may be implemented as a single strip of conductor (as shown in FIG. 20), as a U-shaped shielding conductor (as shown in FIG. 21), as a rectangular ring of conductor (as shown in FIG. 22), or using other suitable layouts.

Figure 24:
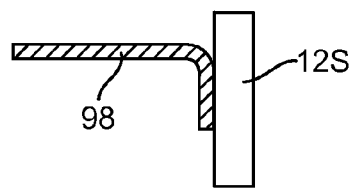
FIG. 24 is a cross-sectional side view of a signal shielding structure of the type shown in FIG. 23 showing how the shielding structure may be grounded to a conductive housing wall structure in accordance with an embodiment of the present invention.
Figure 25:
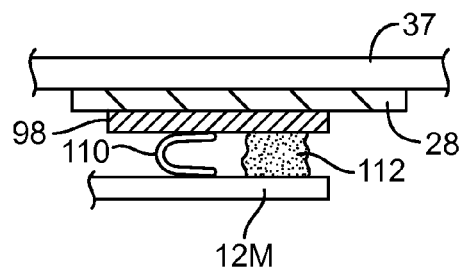
FIG. 25 is a cross-sectional side view of a signal shielding structure of the type shown in FIG. 24 showing how the shielding structure may be grounded to a conductive housing structure using conductive structures interposed between the shielding structure and the conductive housing structure in accordance with an embodiment of the present invention.

Shielding structures such a shielding structure 98 of FIG. 23 may be shorted to ground by electrically connecting shielding structure 98 to conductive housing structures such as midplate 12M, housing walls in housing 12 (e.g., walls formed from a band shaped peripheral conductive member that runs around the periphery of device 10, a conductive bezel that runs around the periphery of device 10 along the front of device 10, etc.). FIG. 24 is a cross-sectional side view of a portion of shielding structure 98 showing how shielding structure 98 may have a shape that forms a connection with conductive housing portion 12S. Portion 12S may be a band shaped peripheral conductive member that runs around the periphery of device 10, other conductive sidewall portions of housing 12, a conductive bezel that runs around the periphery of device 10 along the front of device 10, or other suitable conductive portion of housing 12. Welds, conductive adhesive, conductive fasteners, conductive springs, conductive foam, wires, portions of flex circuits, and other conductive attachment mechanisms may be used to electrically (and, if desired, mechanically) attach shielding structure 98 to ground (e.g., to conductive portions of housing 12). An illustrative configuration in which metal spring 110 and resilient conductive material 112 (e.g., conductive foam, conductive adhesive, etc.) are being used to electrically connect shielding structure 98 to a conductive ground structure such as housing member 12M is shown in the cross-sectional diagram of FIG. 25.

Figure 26:
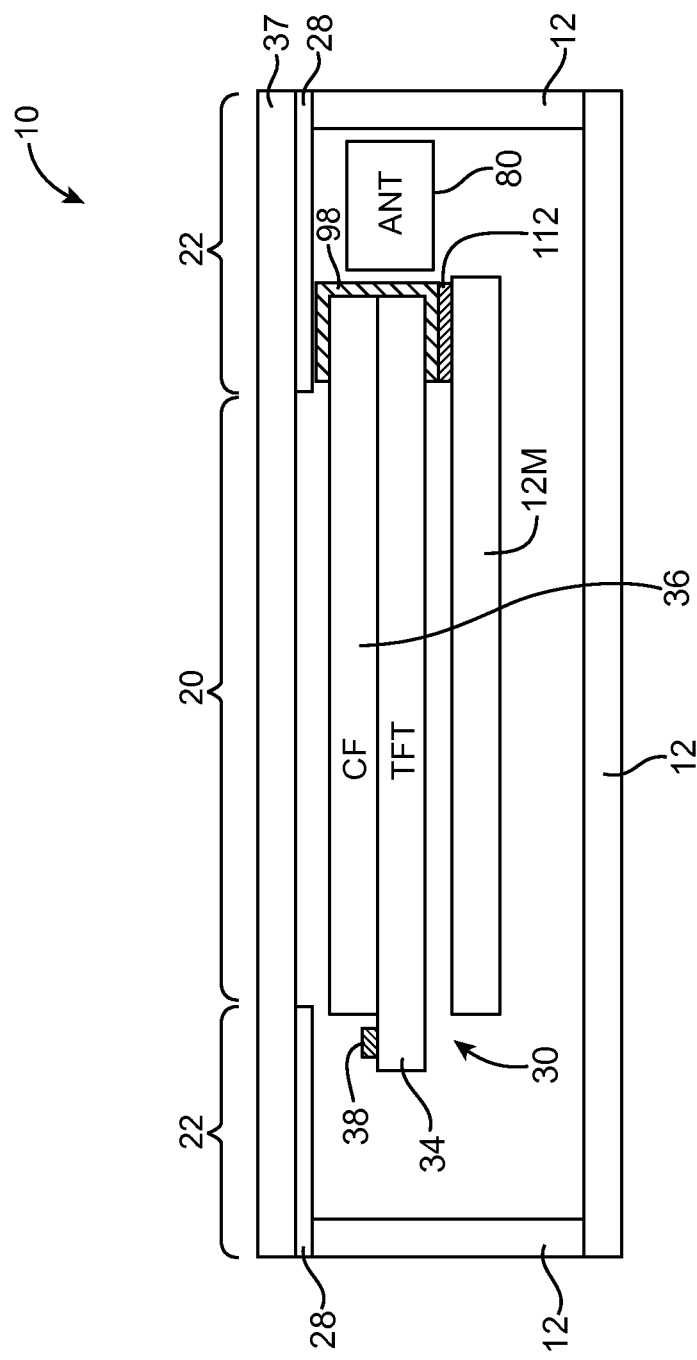
FIG. 26 is a cross-sectional side view of an electronic device with shielding structures that cover one or more edges in a display to help minimize radio-frequency interference between the display and wireless circuitry in the device in accordance with an embodiment of the present invention.

In the illustrative configuration of FIG. 26, shielding structure 98 has been formed from a metal or other conductive material that has been wrapped around the edge of display module 30 in a way that covers both the upper (front) and lower (rear) surfaces of display module 30 and the vertical side edges of display module 30. Shielding structure 98 of FIG. 23 may be implemented as a single strip of conductor (as shown in FIG. 20), as a U-shaped shielding conductor (as shown in FIG. 21), as a rectangular ring of conductor (as shown in FIG. 22), or using other suitable layouts. Materials such as copper tape, other metal tapes, or other conductive materials may be used in forming shielding structures such as shielding structure 98 of FIG. 26. When forming a three-sided structure of the type shown in FIG. 21 (as an example), conductive tape may be wrapped over the edges of display module 30 on the left, right, and lower portions of the display. A conductive path such as a conductive path formed by structure 112 may be used to electrically connect shielding structure 98 to ground (e.g., midplate 12M and/or a sidewall in housing 12). Structure 112 may be formed from a layer of conductive foam, a layer of conductive adhesive, a conductive spring, etc.

Figure 27:
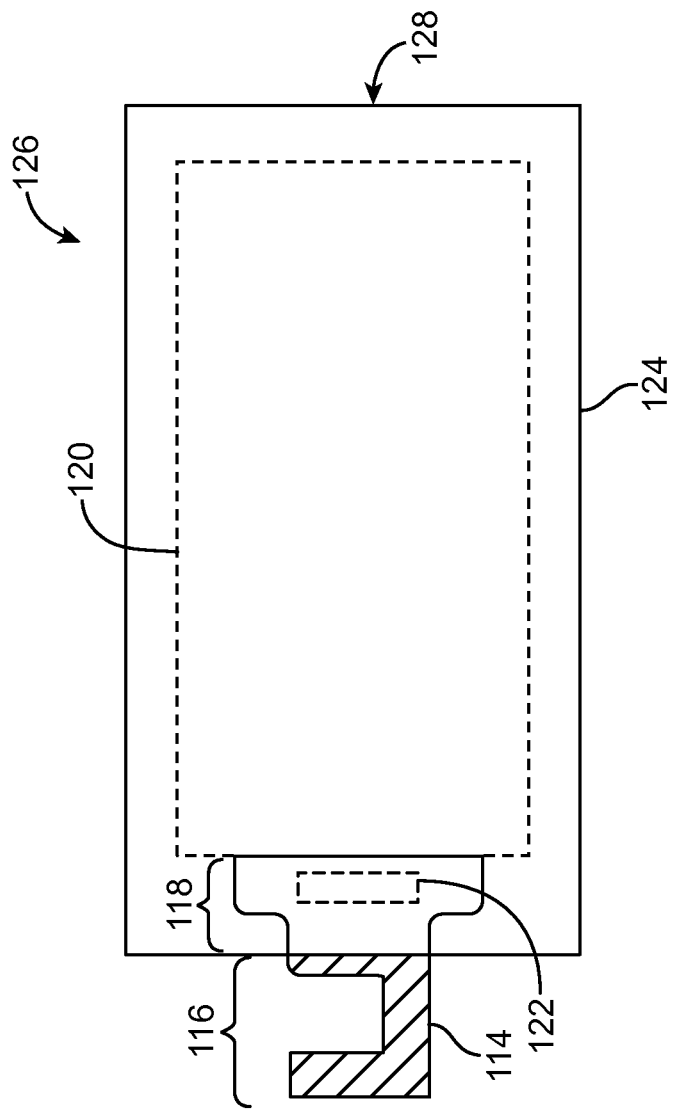
FIG. 27 is a top view of a conventional display module with a flex circuit tail and copper tape that covers a display driver integrated circuit in the display module.

A top view of a conventional display module showing how a flexible printed circuit ("flex circuit") may be pigtailed to the display module is shown in FIG. 27. Flex circuit 114 may be used to carry signals between display module 126 and a logic board. Flex circuits may be formed from patterned conductive traces on flexible sheets of substrate such as polyimide sheets. As shown in FIG. 27, display module 126 may have a rectangular substrate 124 on which display driver integrated circuit 122 is mounted. Flex circuit 114 may have portions 116 and 118. The outermost layer of portion 116 (out of the page in the orientation of FIG. 27) is formed from conductive flex circuit traces. In portion 118, copper tape may be used to provide supplemental signal shielding by covering driver integrated circuit 122.

Figure 28:
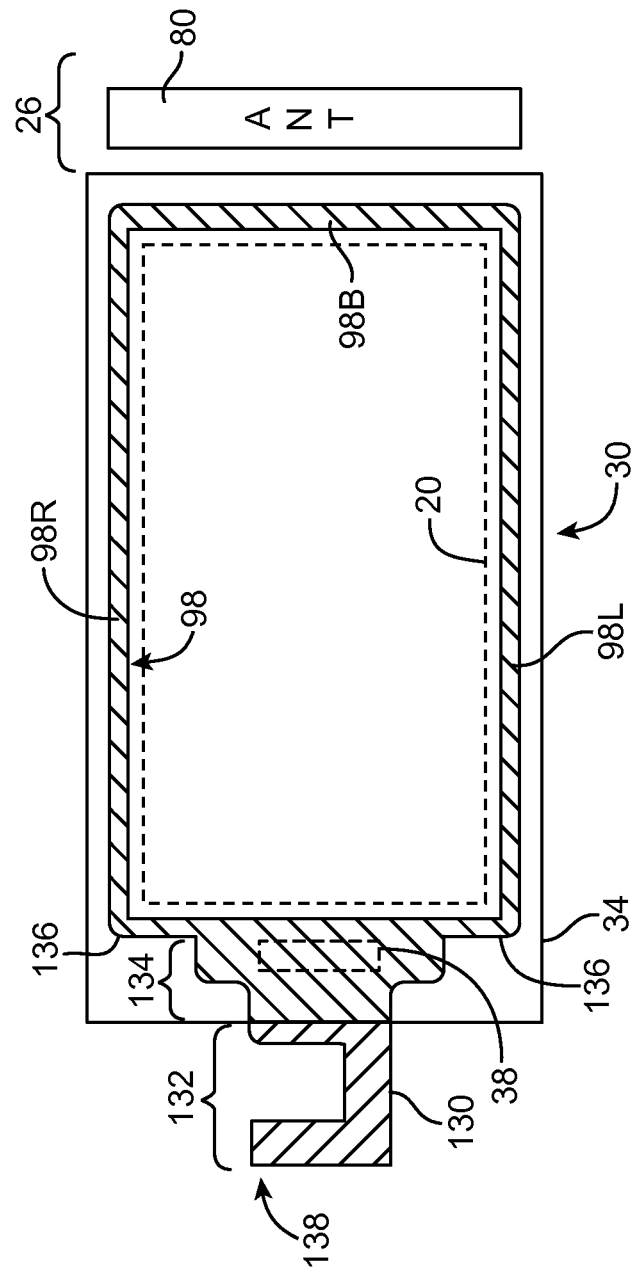
FIG. 28 is a top view of a display module having shielding structures that connect to a conductive layer on a flex circuit tail and that help minimize radio-frequency interference between the display and wireless circuitry in the device in accordance with an embodiment of the present invention.

Structures of the type shown in FIG. 27 generally do not provide desired amounts of signal shielding (e.g., for antenna structures located adjacent to end 128 of substrate 124 along the edge of substrate 124 opposing driver integrated circuit 122). To address this shortcoming, display module 30 may be provided with shielding structure segments such as shielding structure segments 98B between display active region 20 of display module 30 and antenna structures 80 in region 26 of device 10, as shown in FIG. 28. Display module 30 of FIG. 28 may have a flex circuit such as flex circuit 130. Flex circuit 130 may contain patterned conductive traces that form signal lines. These signal lines may be used to route signals to display driver integrated circuit 38 from circuitry on a printed circuit board in device 10.

As shown in FIG. 28, flex circuit 130 may have pigtail portion 132. The outermost layer of flex circuit 130 in region 132 may be formed from an exposed conductive flex circuit trace (e.g., a ground trace). In region 134, a copper tape layer or other structure may be electrically connected to the ground trace and may help shield driver integrated circuit 138 on thin-film-transistor substrate 34.

Shielding structure 98 may surround all of part of active region 20 of display module 30. For example, conductive paths 136 may be used to electrically connect the ground portion of flex circuit 130 and the overlying copper in region 134 to left shielding structure segment 98L and right shielding structure segment 98R. Lower shielding structure 98B may run along the lower edge of display module 30 between active region 20 and antenna structures 80 in region 26. Shielding structure segments 98R, 98L, and 98B (and, if desired, connecting paths 136 and conductive layers covering display driver integrated circuit 38 in region 134) may be formed from copper tape, other metal structures, patterned traces deposited on thin film transistor substrate layer 34, or other conductive materials. The flex circuit in region 132 may be folded to help fit flex circuit 130 within housing 12 of device 10. End 138 of flex circuit 130 may be connected to circuitry on a printed circuit board (as an example). The outermost conductive layer on flex circuit 130 may be used in grounding shielding structure 98.

Figure 29:
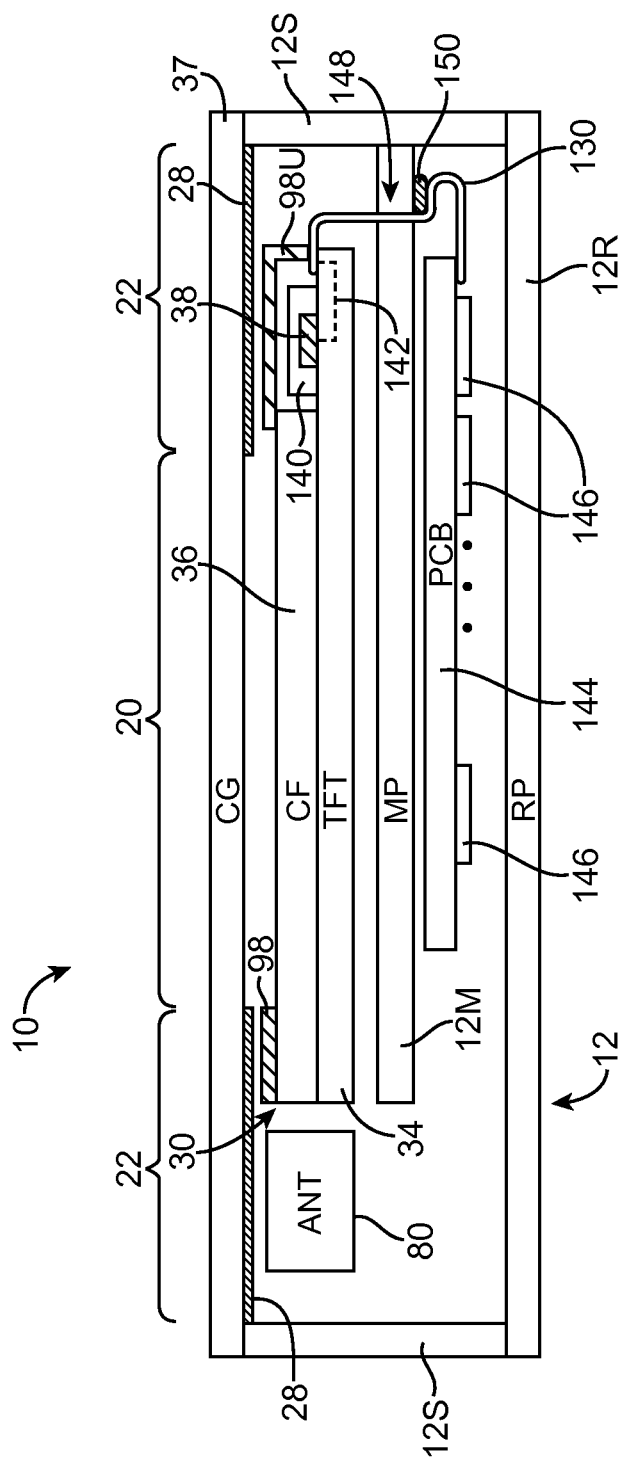
FIG. 29 is a cross-sectional side view of an electronic device having shielding structures of the type shown in FIG. 28 in accordance with an embodiment of the present invention.

A cross-sectional side view showing how flex circuit 130 may be routed between display module 30 and printed circuit board 144 is shown in FIG. 29. As shown in FIG. 29, flex circuit 130 may be connected to traces 142 on thin-film-transistor layer 34. Traces 142 may be used in interconnecting signal paths on flex circuit 130 to driver circuitry 38. Encapsulant 140 may be used to cover circuitry 38.

Shielding structure 98 may be formed in a rectangular ring shape around active portion 20 of display module 30, in a U-shape, in a segment that is interposed between antenna structures 80 in region 26 and active portion 20 of display module 30, etc. The conductive structures that overlap display driver 38 (shown as conductive structures 98U in the example of FIG. 29) may be formed from copper tape that shields driver circuitry 38 or other materials and may be connected to shielding structures 98 that surround other portions of active display region 20 using conducive paths such as paths 136 of FIG. 28.

Flex circuit 130 may be routed to printed circuit board substrate 144 through opening 148 (e.g., a recess) in midplate 12M. Integrated circuits and other components 146 may be mounted on printed circuit board 144. Patterned traces on flex circuit 130 may be used to form signal paths that convey data signals between the circuitry on board 144 and display module 30. A ground trace (e.g., the outermost layer of flex circuit 130) may be used in grounding structure 98U and shielding structures 98 such as the shielding structure shown on the left hand portion of display module 30 in the example of FIG. 29. Conductive structures such as structures 150 may be used to electrically connect the ground trace on the outermost surface of flex circuit 130 to ground elements within device 10 such as conductive housing member 12M and conductive housing sidewalls 12S (i.e., the grounding of shielding structures 98 may be handled exclusively or at least partly using one or more ground traces on flex circuit 130). Rear plate 12R of housing 12 in device 10 may be formed from glass, plastic, metal, etc. Structures 150 may be formed from conductive adhesive, conductive foam, conductive springs, etc.

Figure 30:
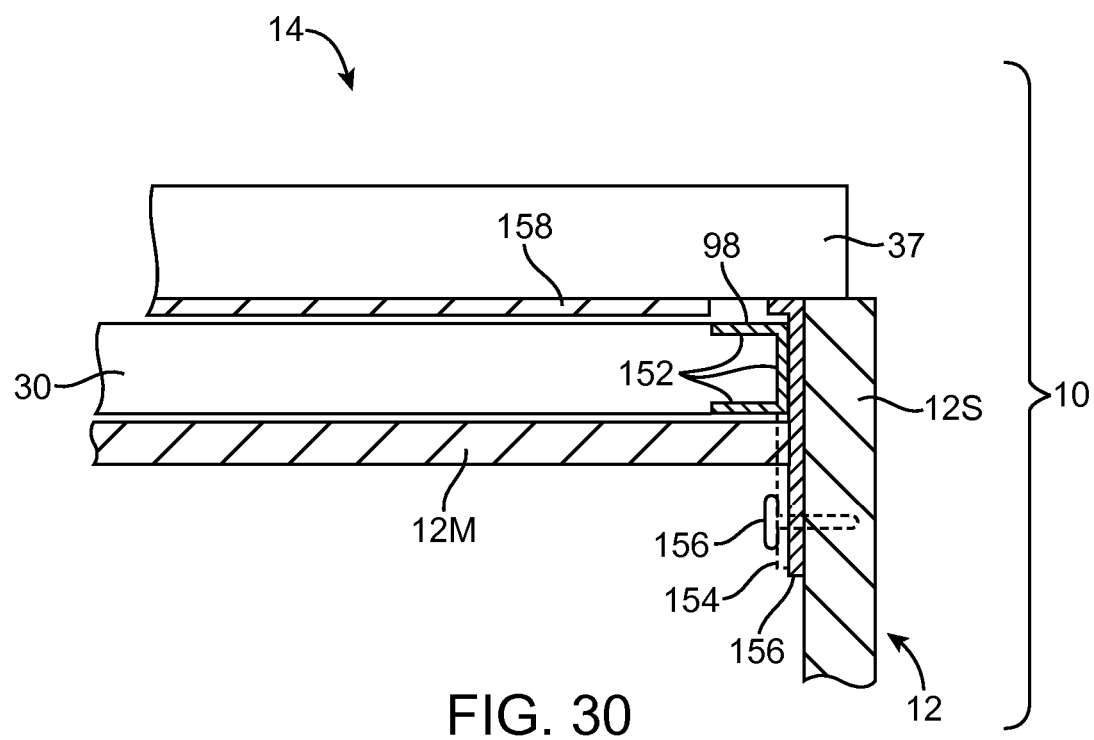
FIG. 30 is a cross-sectional side view of shielding structures and conductive housing structures showing how the shielding structures may be grounded to conductive housing structures such as conductive housing walls in accordance with an embodiment of the present invention.

Another illustrative arrangement for shielding structures 98 is shown in FIG. 30. As shown in FIG. 30, shielding structures 98 may wrap around one or more of the edges of display module 30. Shielding structure 98 may, for example, cover the upper (front) and lower (rear) surfaces of display module 30, as shown by solid portion 152 of structure 98. Dashed line portion 154 of shielding structure 98 shows how shielding structure 98 may have portions that run vertically (i.e., parallel to vertical housing sidewalls 12S). Vertical portions 154 may, for example, be formed along the right and left edges of display module 30 and device 10. Screws such as screw 156 or other conductive attachment structures may be used to electrically connect shielding structure 98 to conductive housing member 12S (e.g., a peripheral conductive housing member that runs around the periphery of device 10). Midplate 12M may have a recess or other opening that allows portion 154 to extend downwards from display module 30 along the side of optional metal housing structure 156. Structure 156 may be a metal frame or a metal bracket that is electrically and mechanically connected to conductive housing member 12S, may be a portion of housing structure 12S, may be other grounded conductive structures in device 10, etc. As illustrated by touch sensor electrode array 158, display 14 in device 10 may be a touch screen display.

Figure 31:
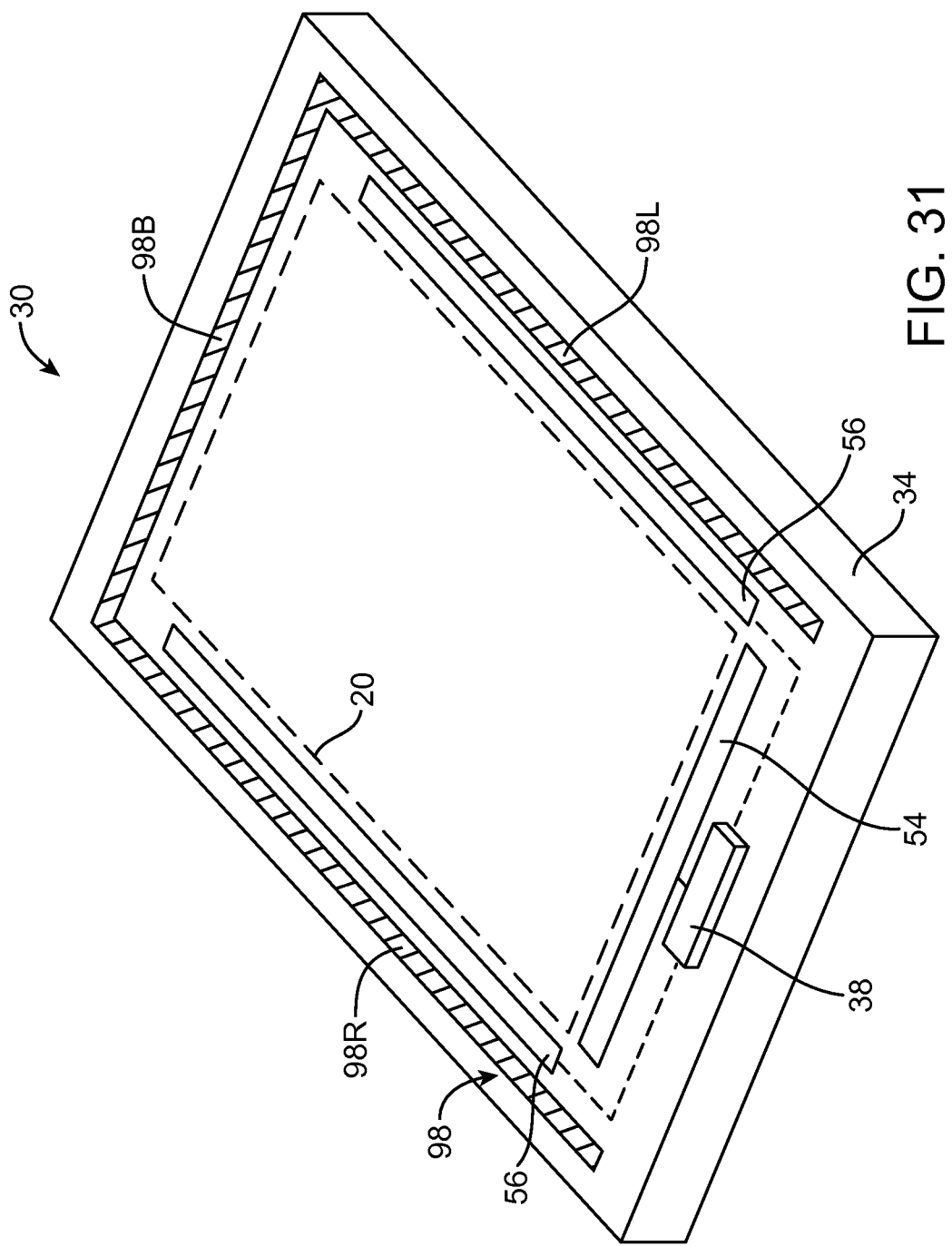
FIG. 31 is a perspective view of a thin-film-transistor (TFT) layer on which shielding structures have been formed to help minimize radio-frequency interference between the display and wireless circuitry in the device in accordance with an embodiment of the present invention.

FIG. 31 is a perspective view of thin-film transistor substrate 34 showing how shielding structure 98 may be formed from conductive traces such as patterned metal traces on thin-film transistor substrate 34. Shielding structure 98 may be formed in a rectangular ring shape around active portion 20 of display module 30, in a U-shape, in a segment that is interposed between antenna structures 80 in region 26 and active portion 20 of display module 30, etc. Shielding structure 98 may, for example, have left trace segment 98L (e.g., a metal line that runs parallel to the left edge of active region 20), right trace segment 98R (e.g., a metal line that runs parallel to the right edge of active region 20), and lower trace segment 98B (e.g., a metal line that is shorted to segments 98L and 98R and that runs parallel to the lower edge of display module 30 at the opposite end of active region 20 from display driver integrated circuit 38). Structures 98 may be formed from metal or other suitable conductive materials.

To avoid undue complexity during fabrication, it may be desirable to form the traces of shielding structure 98 from the same material that is being used to form other conductive structures in display module 30 such as a metal or metal alloy that is being used to form the circuitry of demultiplexer 54, Vcom (common voltage) and gate driver circuitry 56, and the signal lines in active region 20. Examples of materials that may be used in this type of display circuitry include NiAl, and TiAlTi, and MoW (e.g., to satisfy requirements such as being able to form satisfactory ohmic contacts with polysilicon transistors, being lift-off compatible, etc.), so with one suitable arrangement structures 98 may be formed form NiAl, TiAlTi, and/or MoW (i.e., structures 98 may be formed at least partly using the same material that is used in forming some or all of the gate lines, common voltage lines, and data lines in display module 30). Indium tin oxide (ITO) may sometimes be used to form Vcom lines and may, if desired, be used in forming some or all of shielding structures 98. Other illustrative conductive materials that may be used for forming shielding structures 98 include silver paint, nickel paint, printed conductors, etc.

Figure 32:
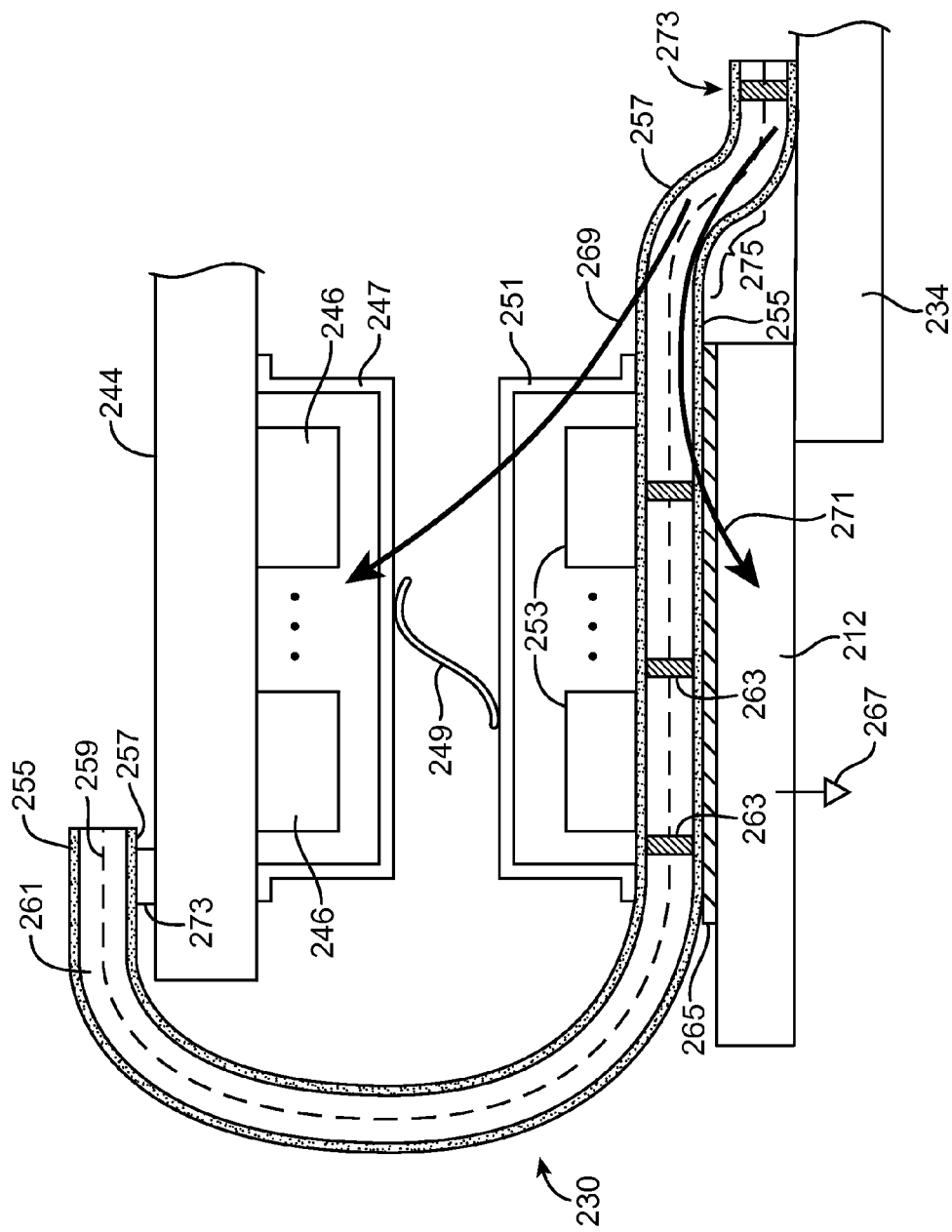
FIG. 32 is a cross-sectional side view of a conventional display module grounding configuration in a cellular telephone.

If desired, the impact of display noise on antenna performance may be mitigated by disrupting the ground path between the display and system ground that is present in conventional cellular telephones. A cross-sectional side view of a portion of a conventional cellular telephone is shown in FIG. 32. As shown in FIG. 32, display module 234 is connected to printed circuit board 244 via flex circuit 230. Flex circuit 230 is a three-layer flex circuit that contains signal traces 259 in a central layer and contains outer layer traces 255 and 257 on opposing outer flex circuit layers. Traces 255 and 257 form ground paths between printed circuit board 244 and display module 234. Board-to-board connector 273 connects flex circuit 230 to printed circuit board 244.

Electrical components 246 are mounted on printed circuit board 244 and are covered by electromagnetic shield 247. Shield 251 is used to cover electrical components (capacitors) 253 on flex circuit 230. Spring 249 forms a short circuit path between shield 251 and shield 247.

Metal housing midplate 212 forms system ground (shown schematically as ground 267 in FIG. 32). Vias 263 in flex circuit 230 are used to electrically connect ground trace 257 to ground trace 255. Vias 263 are formed in the region of flex circuit 230 that overlaps conductive adhesive 263. Conductive adhesive 265 electrically connects ground trace 255 to midplate 212. Traces 255 and 257 are grounded to display module 234 at end 273 of flex circuit 230.

During operation of display 234, noise signals are able to flow between display module 234 and printed circuit board 244 via ground trace 257, shield 251, spring 249, and shield 247. This ground path is depicted as ground path 269 in FIG. 32. Another ground path that is formed using the conventional arrangement of FIG. 32 is depicted as ground path 271 in FIG. 32. Path 271 allows noise signals to pass from display module 234 directly to system ground 267 (e.g., through trace 257, vias 263, and trace 255). The presence of vias 263 in the region of flex circuit 230 that overlaps conductive adhesive 265 and the presence of ground trace 255 in region 275 of flex circuit 230 help form path 271. Path 271, however, serves as a source of undesired coupling between the display driver circuitry of module 234 and antenna structures in the cellular telephone of FIG. 32, because system ground 267 (e.g., midplate 212) is used in forming antenna ground for the antenna structures.

Figure 33:
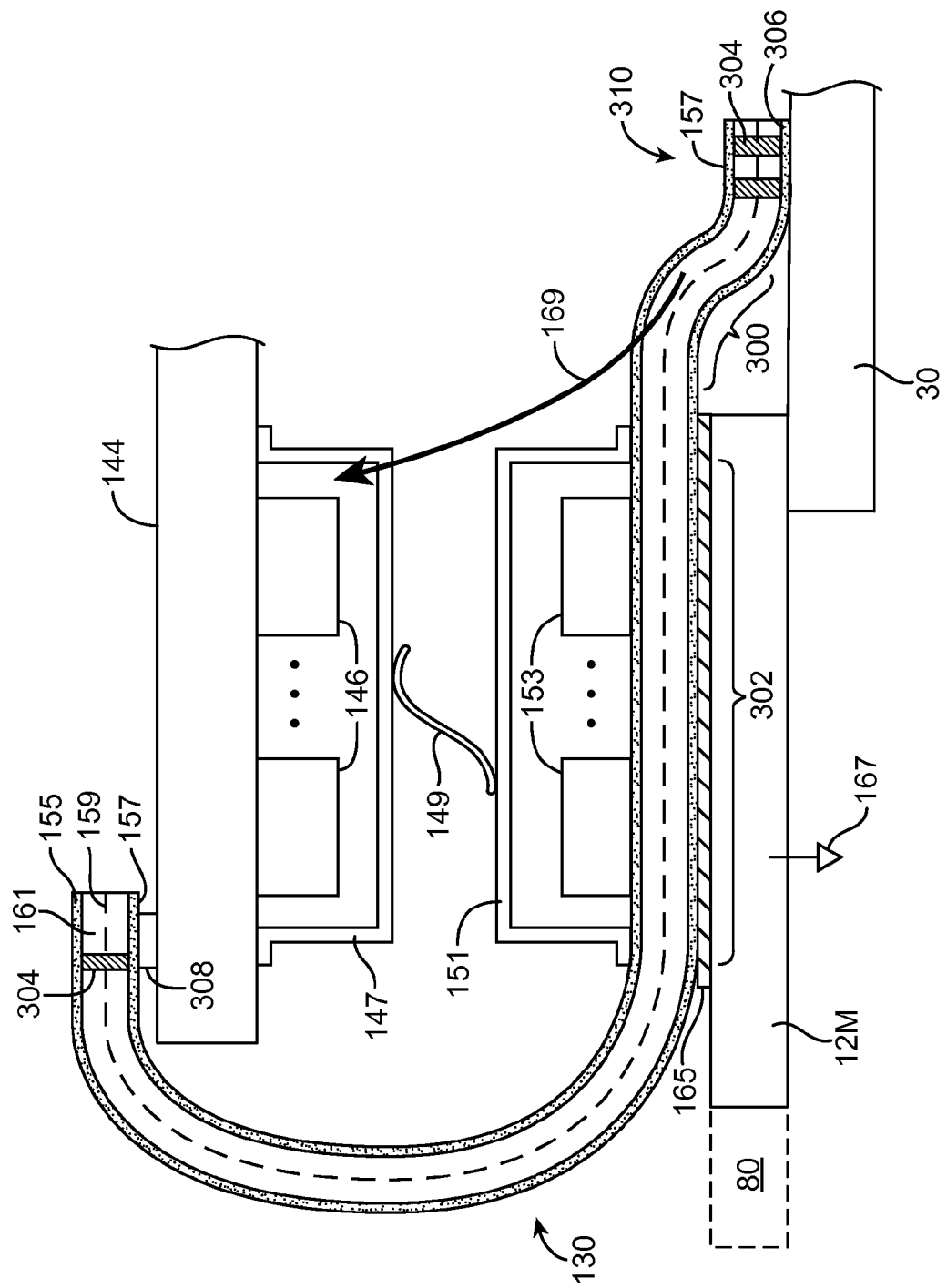
FIG. 33 is a cross-sectional side view of a display module grounding configuration in accordance with an embodiment of the present invention.

Arrangements of the type shown in FIG. 33 do not form undesired path 271 and may therefore help mitigate the effects of display noise on antenna performance.

The structures of FIG. 33 may be formed in a device such as device 10 of FIG. 1. As shown in FIG. 33, printed circuit board 144 (e.g., a main logic board) may be connected to flex circuit 130 using a connector such as board-to-board connector 308. Flex circuit 130 may have multiple layers. For example, flex circuit 130 may have two layers, three layers, or more than three layers. In the illustrative configuration shown in FIG. 33, flex circuit 130 has three layers. Inner layer 159 may be used in forming signal traces. Outer layers 155 and 157 may be used for signal traces (if desired) and may be used in forming ground paths. When forming ground paths, most or all of the outermost surfaces of flex circuit 130 may be occupied by ground traces 155 and 157.

Path 155 may be shorted to path 157 using vias 304 (e.g., vias in the vicinity of board-to-board connector 308 and at end 310 of flex circuit 130). Region 302 (i.e., the region of flex circuit 130 that overlaps conductive adhesive 165) of flex circuit 130 is preferably devoid of vias. There is also preferably a gap in ground trace 155 in region 300 (i.e., there is no metal for ground trace 155 in region 300 of flex circuit 130, so gap 300 forms an open circuit between traces such as trace 306 at end 310 of flex circuit 130 at display module 30 and system ground 167).

Because region 302 is via free and because ground trace 155 is missing in region 300, there is no direct ground path between display module 30 and system ground 167 (metal housing midplate structure 12M). Ground trace 155 may still be used to ground printed circuit board 144 to system ground 12M using conductive adhesive 165, but there is no direct coupling between the potentially noisy ground in display module 30 and conductive housing structure 12M. Housing structure 12M may be used in forming antenna ground for antenna structures 80 in device 10 (as shown in FIG. 33), so the absence a conventional direct ground path between display module 30 and system ground 167 may help reduce interference between display module 30 and antenna structures 80.

As shown in FIG. 33, path 169 may be used to help ground display module 30 to printed circuit board 144. Printed circuit board 144 may have components 146 (e.g., integrated circuits, etc.) that are shielded using electromagnetic (radio-frequency) shield 147. Shield 147 may be connected to shield 151 using spring 149 or other conductive structures. Shield 151 may be used to shield components 153 such as capacitors on flex circuit 130. Shield 151 may be electrically connected to ground trace 157, so signals in path 169 may flow along trace 157, shield 151, conductive structures 149, and shield 147. Path 169 does not flow directly to system ground 167, so noise from display module 30 is not strongly coupled to antenna structures 80. Arrangements of the type shown in FIG. 33 may be used in conjunction with the interference-reducing shielding structures of device 10 to help further reduce interference.

The foregoing is merely illustrative of the principles of this invention and various modifications can be made by those skilled in the art without departing from the scope and spirit of the invention.

What is claimed is:

1. An electronic device, comprising:
   antenna structures;
   a display module that generates radio-frequency display module noise signals; and
   a radio-frequency shielding structure having at least one conductive segment that runs along an edge of the display module, wherein at least part of the radio-frequency shielding structure is interposed between the display module and the antenna structures and shields the antenna structures from the radio-frequency display module noise signals.

2. The electronic device defined in claim 1 wherein the display module comprises a substrate, wherein the at least one conductive segment comprises three conductive segments that respectively run along three edges of the display module, and wherein the three conductive segments comprise conductive traces on the substrate.

3. The electronic device defined in claim 2 wherein the substrate comprises a thin-film-transistor layer that includes a plurality of thin-film transistors.

4. The electronic device defined in claim 3 wherein the thin-film-transistor layer comprises a layer of glass and wherein the conductive segments comprise metal traces on the glass.

5. The electronic device defined in claim 4 wherein the display module comprises gate lines, common voltage lines, and data lines and wherein the metal traces are formed from a material that is also used in forming at least part of the gate lines, common voltage lines, and data lines.

6. The electronic device defined in claim 1 wherein the shielding structure comprises metal tape.

7. The electronic device defined in claim 1 wherein the display module has a front surface and a rear surface, wherein the at least one conductive segment comprises three conductive segments that respectively run along three edges of the display module, and wherein the shielding structure wraps around the three edges of the display module so that at least some of the front surface and at least some of the rear surface of the display module are covered by the shielding structure.

8. The electronic device defined in claim 1 wherein the display module comprises conductive lines and display driver circuitry that is configured to drive pulses onto the conductive lines that have smoothed edges to reduce frequency harmonics in the radio-frequency display module noise signals.

9. The electronic device defined in claim 1 wherein the display module comprises display driver circuitry and conductive lines onto which the display driver circuitry drives display control pulses, wherein the conductive lines include loading circuitry that is configured to smooth edges in the display control pulses to reduce frequency harmonics in the radio-frequency display module noise signals.

10. The electronic device defined in claim 1, wherein the display module has opposing first and second ends, the electronic device further comprising:
    a display driver integrated circuit mounted at the first end of the display module, wherein the conductive segment is at the second end of the display module and wherein the conductive segment is interposed between the display module and the antenna structures.

11. The electronic device defined in claim 10 wherein the display module includes a color filter layer and a thin-film-transistor layer and wherein the radio-frequency shielding structure is formed on the thin-film-transistor layer.

12. The electronic device defined in claim 10 further comprising a cover layer that covers the display module, wherein the radio-frequency shielding structure is formed on the cover layer.

13. The electronic device defined in claim 12 wherein the cover layer comprises a glass substrate having a patterned opaque masking layer and wherein the radio-frequency shielding structure comprises a metal trace formed on the opaque masking layer.

14. The electronic device defined in claim 10 further comprising a housing in which the display module is mounted, wherein the housing comprises a peripheral conductive member that runs along peripheral edges of the housing, wherein the housing comprises a conductive plate that is connected to the peripheral conductive member, and wherein the conductive plate comprises a protrusion on which the radio-frequency shielding structure is formed.

15. The electronic device defined in claim 14 further comprising a layer of plastic interposed between the protrusion and the radio-frequency shielding structure.

16. The electronic device defined in claim 10 further comprising:
    a housing that forms a ground element; and
    a flexible printed circuit having a ground trace, wherein the radio-frequency shielding structure is electrically connected to the ground element at least partly by the ground trace on the flexible printed circuit.

17. The electronic device defined in claim 1 further comprising:
    a housing, wherein the antenna structures comprise a cellular telephone antenna at a first end of the housing, wherein the display module has opposing first and second ends and an active region between the first and second ends, wherein the display has a display driver circuit at the first end of the display module, wherein the cellular telephone antenna is located adjacent to the second end of the display module, wherein the radio-frequency shielding structures area interposed between the cellular telephone antenna and the active region of the display module.

18. The electronic device defined in claim 17 wherein the display module has a longitudinal axis that passes through the first and second ends and wherein the radio-frequency shielding structures comprise at least one metal segment that runs perpendicular to the longitudinal axis.

19. The electronic device defined in claim 18 wherein the metal segment is formed on a substrate layer in the display module.

20. The electronic device defined in claim 18 further comprising a layer of cover glass that covers the display module, wherein the metal segment is formed on the cover glass.

21. The electronic device defined in claim 18 wherein the housing comprises a conductive plate having a portion that is covered by a plastic layer and wherein the metal segment is formed on the plastic layer.

22. The electronic device defined in claim 18 wherein the housing comprises conductive portions that form a ground element and wherein the electronic device further comprises conductive structures that electrically connect the metal segment to the ground element.

23. The electronic device defined in claim 22 wherein the conductive structures comprise conductive foam.

24. The electronic device defined in claim 22 wherein the conductive structures comprise a metal spring.

25. The electronic device defined in claim 22 wherein the conductive structures comprise a metal path on a thin-film-transistor layer in the display module.

26. The electronic device defined in claim 1 further comprising:
a conductive housing structure that forms a system ground, wherein the antenna structures comprise a cellular telephone antenna that is formed at least partly using the conductive housing structure;
a printed circuit board on which integrated circuits are mounted; and
a flex circuit that grounds the printed circuit board to the display module, wherein the flex circuit has at least one ground trace that is connected to the conductive housing structure by conductive adhesive and wherein the flex circuit is devoid of vias in a region overlapping the conductive adhesive.

27. The electronic device defined in claim 26 wherein the flex circuit has at least three layers including a first outer layer and a second outer layer, wherein the ground trace is formed from the first outer layer, and wherein the second outer layer forms an additional ground trace, and wherein the flex circuit is devoid of vias that connect the ground trace and the additional ground trace in the region overlapping the conductive adhesive, wherein the ground trace forms a ground path between the printed circuit board and the conductive housing structure, and wherein the additional ground trace forms a ground path between the printed circuit board and the display module.

28. The electronic device defined in claim 27 wherein the ground trace has a gap that is devoid of metal, wherein the gap is located between the display module and the region overlapping the conductive adhesive, and wherein the gap forms an open circuit in the ground trace between the display module and the system ground.

* * * * *